United States Patent
Harada

(10) Patent No.: US 12,482,094 B2
(45) Date of Patent: Nov. 25, 2025

(54) IMAGE INSPECTION DEVICE, CONSOLE, AND RADIOGRAPHIC SYSTEM

(71) Applicant: FUJIFILM Corporation, Tokyo (JP)

(72) Inventor: Daiki Harada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 351 days.

(21) Appl. No.: 17/689,990

(22) Filed: Mar. 9, 2022

(65) Prior Publication Data

US 2022/0198663 A1 Jun. 23, 2022

Related U.S. Application Data

(63) Continuation of application No. PCT/JP2020/033918, filed on Sep. 8, 2020.

(30) Foreign Application Priority Data

Sep. 10, 2019 (JP) .................. 2019-164437

(51) Int. Cl.
| | |
|---|---|
| *A61B 6/46* | (2024.01) |
| *A61B 6/00* | (2024.01) |
| *G06T 3/60* | (2006.01) |
| *G06T 7/00* | (2017.01) |
| *G06T 7/70* | (2017.01) |
| *G06V 10/98* | (2022.01) |

(52) U.S. Cl.
CPC ............ *G06T 7/0012* (2013.01); *A61B 6/463* (2013.01); *A61B 6/54* (2013.01); *G06T 3/60* (2013.01); *G06T 7/70* (2017.01); *G06T 2200/24* (2013.01); *G06T 2207/10116* (2013.01); *G06T 2207/20132* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 6,055,326 A | 4/2000 | Chang et al. | |
| 6,542,579 B1 | 4/2003 | Takasawa | |
| (Continued) | | | |

FOREIGN PATENT DOCUMENTS

| | | |
|---|---|---|
| CN | 101721220 | 6/2010 |
| CN | 105510333 | 4/2016 |
| (Continued) | | |

OTHER PUBLICATIONS

"Office Action of Japan Counterpart Application", issued on Mar. 7, 2023, with English translation thereof, p. 1-p. 8.

(Continued)

*Primary Examiner* — Mohammed Rachedine
(74) *Attorney, Agent, or Firm* — JCIPRNET

(57) ABSTRACT

An image inspection device includes a radiation image acquisition unit that acquires a radiation image obtained by imaging a subject using radiation, an imaging condition recognition unit that recognizes an imaging condition relating to an imaging direction and/or laterality of the subject reflected in the radiation image, and a marker superimposition unit that superimposes, on the radiation image, a marker indicating the imaging direction and/or laterality of the subject reflected in the radiation image by using a result of the recognition of the imaging condition recognition unit.

12 Claims, 17 Drawing Sheets

(56) References Cited

U.S. PATENT DOCUMENTS

| | | | |
|---|---|---|---|
| 2006/0106375 A1* | 5/2006 | Werneth | A61B 18/1492 |
| | | | 606/41 |
| 2008/0240360 A1 | 10/2008 | Jabri | |
| 2010/0104167 A1 | 4/2010 | Sakaguchi et al. | |
| 2013/0058545 A1 | 3/2013 | Pearson, Jr. et al. | |
| 2013/0279773 A1 | 10/2013 | Masumoto et al. | |
| 2014/0051991 A1 | 2/2014 | Sakaguchi et al. | |
| 2016/0220219 A1* | 8/2016 | Lalena | A61B 6/4464 |
| 2016/0302754 A1* | 10/2016 | Bracken | A61B 6/5247 |
| 2017/0014093 A1 | 1/2017 | Hosoki et al. | |
| 2017/0065235 A1 | 3/2017 | Sakaguchi et al. | |
| 2017/0196525 A1 | 7/2017 | Kim et al. | |
| 2017/0322484 A1* | 11/2017 | Erhard | A61B 6/467 |
| 2018/0317865 A1 | 11/2018 | Sakaguchi et al. | |
| 2019/0223825 A1 | 7/2019 | Suzuki | |
| 2020/0000420 A1 | 1/2020 | Sakaguchi et al. | |
| 2021/0030377 A1 | 2/2021 | Sakaguchi et al. | |
| 2023/0129981 A1 | 4/2023 | Sakaguchi et al. | |
| 2024/0188909 A1 | 6/2024 | Sakaguchi et al. | |

FOREIGN PATENT DOCUMENTS

| | | | | |
|---|---|---|---|---|
| CN | 106344051 | | 1/2017 | |
| DE | 102018212389 B3 * | | 1/2020 | A61B 6/4208 |
| JP | H0896125 | | 4/1996 | |
| JP | 2000107159 | | 4/2000 | |
| JP | 2004337291 | | 12/2004 | |
| JP | 2004337291 A * | | 12/2004 | |
| JP | 2008161532 | | 7/2008 | |
| JP | 2008161532 A * | | 7/2008 | |
| JP | 2011115408 A * | | 6/2011 | A61B 17/1725 |
| JP | 2013102851 | | 5/2013 | |
| JP | 2013220319 | | 10/2013 | |
| JP | 2019055004 | | 4/2019 | |
| JP | 2019122724 | | 7/2019 | |
| WO | WO-2015074869 A1 * | | 5/2015 | A61B 6/5247 |
| WO | 2018160615 | | 9/2018 | |

OTHER PUBLICATIONS

"International Search Report (Form PCT/ISA/210) of PCT/JP2020/033918," mailed on Nov. 24, 2020, with English translation thereof, pp. 1-5.
"Written Opinion of the International Searching Authority (Form PCT/ISA/237)" of PCT/JP2020/033918, mailed on Nov. 24, 2020, with English translation thereof, pp. 1-8.
"Notice of Reasons for Refusal of Japan Counterpart Application", issued on Dec. 13, 2022, with English translation thereof, p. 1-p. 9.
"Search Report of Europe Counterpart Application", issued on Oct. 5, 2022, p. 1-p. 6.
"Office Action of China Counterpart Application", with English translation thereof, issued on Feb. 25, 2025, pp. 1-18.
"Office Action of China Counterpart Application", with English translation thereof, issued on Aug. 20, 2024, pp. 1-20.

* cited by examiner

FIG. 18
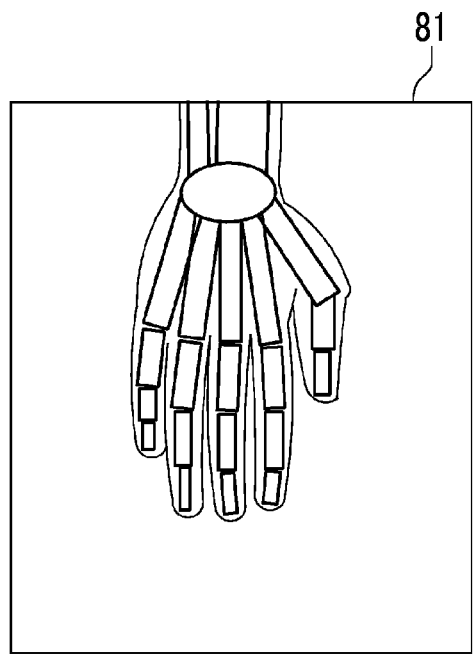
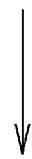
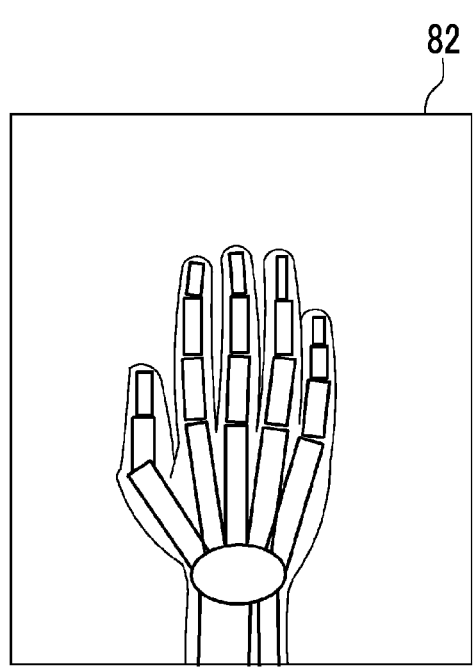

FIG. 19
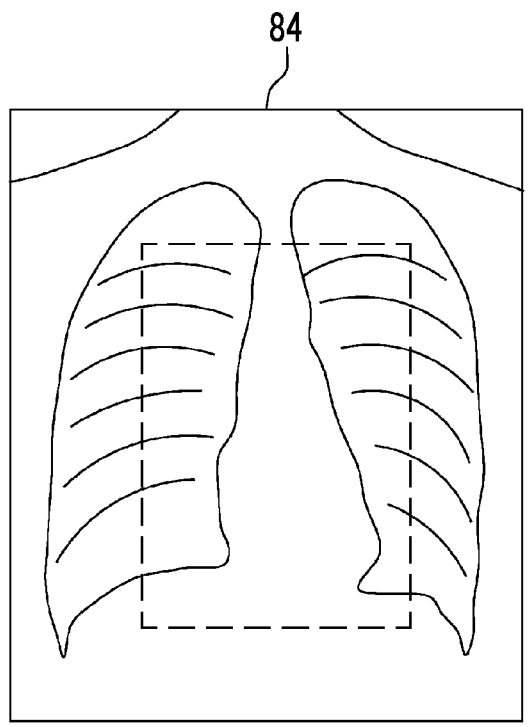
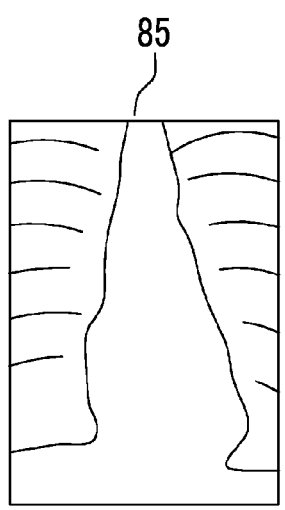

FIG. 21

| IMAGE INSPECTION HISTORY | | | AUTOMATIC RE-IMAGE INSPECTION MODE |
|---|---|---|---|
| IMAGE INSPECTION PROCESSING | CONTENT OF PROCESSING | IMAGE | UNDO |
| (INITIAL IMAGE) | - | | MAINTAIN / REDO |
| DEFECTIVE IMAGE | NOT DEFECTIVE | | MAINTAIN / REDO |
| DENSITY | NO ADJUSTMENT | | MAINTAIN / REDO |
| CONTRAST | ADJUSTMENT 500/1 | | MAINTAIN / REDO |
| ANGLE ADJUSTMENT | NO ADJUSTMENT | | MAINTAIN / REDO |

IMAGE INSPECTION DEVICE, CONSOLE, AND RADIOGRAPHIC SYSTEM

CROSS-REFERENCE TO RELATED APPLICATIONS

This application is a Continuation of PCT International Application No. PCT/JP2020/033918 filed on 8 Sep. 2020, which claims priority under 35 U.S.C. § 119(a) to Japanese Patent Application No. 2019-164437 filed on 10 Sep. 2019. The above application is hereby expressly incorporated by reference, in its entirety, into the present application.

BACKGROUND OF THE INVENTION

1. Field of the Invention

The present invention relates to an image inspection device, a console, and a radiographic system.

2. Description of the Related Art

In a medical field, diagnosis or the like using a radiation image obtained by imaging a subject with radiation such as X-rays has become widespread. In radiography, an image inspection step (so-called quality assurance (QA)) step) for confirming whether or not the obtained radiation image is suitable for diagnosis or the like is usually performed. The image inspection step includes a plurality of steps, for example, defective image determination for determining imaging failure (that is, necessity of re-imaging), adjustment of a density and a contrast, adjustment of an angle of the subject reflected in the radiation image, trimming for cutting out a part relating to diagnosis or the like, and superimposition of a marker indicating an imaging direction and/or laterality of the subject reflected in the radiation image.

In recent years, there has been known an apparatus that automatically performs defective image determination using a preview image having a reduced image quality of a radiation image (JP2013-102851A). In addition, there has been also known an apparatus that automatically adjusts contrast by automatically determining a window level (WL) and a window width (WW) (JP1996-96125A (JP-H8-96125A)).

SUMMARY OF THE INVENTION

Since the image inspection step needs to be performed on all of the captured radiation images, it leads to a workload of a radiological technician or a doctor who performs the radiography. Therefore, it is desired to automate the image inspection step and reduce the workload of the radiological technician or the like.

In particular, the content of the marker indicating the imaging direction and/or laterality of the subject may not be directly determined from the captured radiation image alone. In this case, since it is necessary to make determination by comparing the captured radiation image with a menu or an order relating to the imaging, and to input the content of the marker, the workload is heavy.

An object of the present invention is to provide an image inspection device, a console, and a radiographic system that reduce a workload of an image inspection step by automatically and accurately superimposing a marker indicating an imaging direction and/or laterality of a subject on a radiation image.

The present invention relates to an image inspection device comprising: a processor, in which the processor acquires a radiation image obtained by imaging a subject using radiation, recognizes an imaging condition relating to an imaging direction and/or laterality of the subject reflected in the radiation image, and superimposes, on the radiation image, a marker indicating the imaging direction and/or laterality of the subject reflected in the radiation image by using a result of the recognition.

It is preferable that the processor acquires an imaging menu relating to capturing of the radiation image, and recognizes the imaging condition by using the imaging menu and the radiation image.

It is preferable that the processor acquires, before radiography for obtaining the radiation image, a camera image obtained by imaging the subject by a method different from the radiography, and recognizes the imaging condition by using the camera image.

It is preferable that the processor recognizes a position where the marker is to be superimposed on the radiation image by using the radiation image, and superimposes the marker on the recognized position or moves the marker to the recognized position.

It is preferable that the processor superimposes, in a case of performing defective image determination for determining necessity of re-imaging for the radiation image, the marker on the radiation image for which the re-imaging is determined to be unnecessary in the defective image determination by using the result of the recognition.

It is preferable that the processor superimposes, in a case of adjusting a density and/or contrast of the radiation image, the marker on the radiation image whose density and/or contrast is adjusted by using the result of the recognition.

It is preferable that the processor superimposes, in a case of adjusting an angle of the subject in the radiation image, the marker on the radiation image in which the angle of the subject is adjusted by using the result of the recognition.

It is preferable that the processor superimposes, in a case of performing trimming processing of cutting out a part of the radiation image, the marker on the radiation image after the trimming processing by using the result of the recognition.

It is preferable that the processor displays a history of an image inspection step including superimposition processing of the marker.

It is preferable that the processor receives a redo instruction for at least a part of an image inspection step including superimposition processing of the marker, and in a case of receiving the redo instruction, in addition to redoing the image inspection step for which the processor receives the redo instruction, automatically re-executes at least the image inspection step performed after the image inspection step for which the processor receives the redo instruction, in accordance with a result of the image inspection step for which the processor receives the redo instruction.

In addition, the present invention relates to a console which performs a control of a radiographic system including a radiation generation unit that generates radiation and a radiographic unit that images a subject using the radiation, comprising: the image inspection device. In addition, the present invention relates to a radiographic system comprising the console.

In addition, the present invention relates to a radiographic system comprising: a radiation generation unit that generates radiation; a radiographic unit that images a subject using the radiation; and a processor, in which the processor recognizes an imaging condition relating to an imaging direction and/or laterality of the subject reflected in a radiation image obtained by using the radiographic unit, and superimposes, on the radiation image, a marker indicating the imaging direction and/or laterality of the subject reflected in the radiation image by using a result of the recognition.

An image inspection device, a console, and a radiographic system according to an aspect of the present invention can reduce a workload of an image inspection step by automatically and accurately superimposing a marker indicating an imaging direction and/or laterality of a subject on a radiation image.

BRIEF DESCRIPTION OF THE DRAWINGS

FIG. 18 is an explanatory diagram showing a step of adjusting an angle of the subject.

FIG. 19 is an explanatory diagram showing a trimming processing step.

FIG. 20 is a block diagram showing a function of an image inspection device comprising an image inspection history display unit and the like.

FIG. 21 is an explanatory diagram showing an image inspection history display.

DESCRIPTION OF THE PREFERRED EMBODIMENTS

An image inspection device of an embodiment of the present invention is used in an image inspection step of a radiation image obtained by imaging a subject using radiation. The image inspection step is performed, for example, by a radiological technician who performs the imaging. The image inspection device may be installed in, for example, an image inspection room of the radiology department, or may be installed in a place other than the radiology department.

Figure 1:
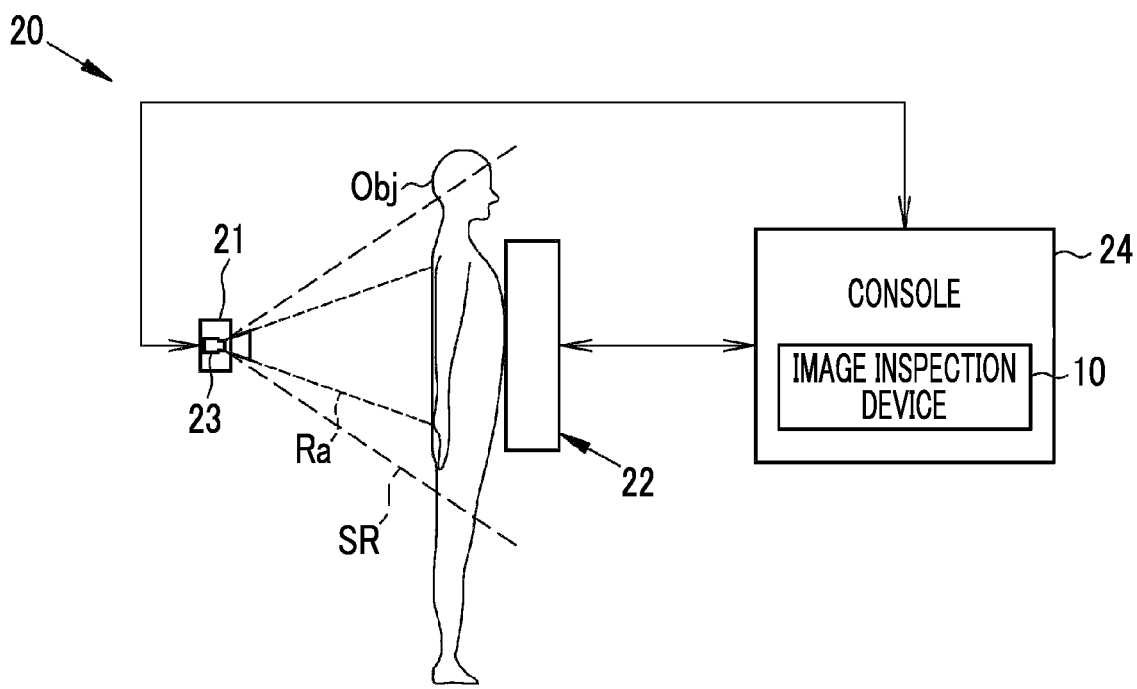
FIG. 1 is an explanatory diagram showing a configuration of a radiographic system.

As shown in FIG. 1, an image inspection device 10 constitutes a radiographic system 20. The radiographic system 20 comprises a radiation source 21 which is a radiation generation unit, a radiographic unit 22, a camera 23, a console 24, and an image inspection device 10.

The console 24 is a main control device (so-called computer) of the radiographic system 20, and is, for example, a personal computer or a computer such as a workstation in which an application program for executing a predetermined function is installed. The image inspection device 10 is also, for example, a personal computer or a computer such as a workstation in which an application program for executing a predetermined function is installed. In the present embodiment, the computer of the console 24 also executes the function of the image inspection device 10. In this case, the console 24 comprises the image inspection device 10. The image inspection device 10 may be a computer common to the computer of the console 24 as in the present embodiment, or may be a computer other than the console 24. The form thereof is not limited. Therefore, the image inspection device 10 may be included in other devices, or may be a single device.

The radiation source 21 generates radiation Ra used for radiography. In the present embodiment, the radiation source 21 is an X-ray source that generates X-rays. Therefore, the radiographic system 20 is an X-ray imaging system that acquires an X-ray image of a subject Obj by imaging the subject Obj using X-rays. The subject Obj is, for example, a person.

The radiographic unit 22 images the subject Obj using the radiation Ra generated by the radiation source 21. The radiographic unit 22 includes a so-called radiation detector, and is, for example, a flat panel detector (FPD). The FPD outputs a radiation image of the subject Obj by detecting the radiation Ra transmitted through the subject Obj and converting it into an electric signal. In the imaging using the radiographic unit 22, a grid (not shown) may be used in combination as needed. The grid is a device that removes scattered radiation components of radiation, for example, a static type Lysholm blende, a mobile type Bucky blende, or the like. In the present embodiment, the radiographic unit 22 includes one radiation detector and outputs one radiation image by one time of irradiation of the radiation Ra.

The radiation detector included in the radiographic unit 22 may be either an indirect conversion type radiation detector or a direct conversion type radiation detector. The indirect conversion type radiation detector is a detector that indirectly obtains an electric signal by converting the radiation Ra into visible light using a scintillator made of cesium iodide (CsI) or the like and photoelectrically converting the visible light. The direct conversion type radiation detector is a detector that directly converts the radiation Ra into an electric signal using a scintillator made of amorphous selenium or the like. In addition, the radiation detector included in the radiographic unit 22 may be a penetration side sampling (PSS) method radiation detector or an irradiation side sampling (ISS) method radiation detector. The PSS method is a method in which a scintillator is arranged on the subject Obj side with respect to a thin film transistor (TFT) that reads out an electric signal. Contrary to the PSS method, the ISS method is a method in which the scintillator and the TFT are arranged in the order of the TFT and the scintillator from the subject Obj side.

The camera 23 images the subject Obj arranged with respect to the radiographic unit 22 by using visible light, infrared light, or the like (light having a wavelength or energy distribution different from that of the radiation Ra). More specifically, the camera 23 is, for example, a digital camera or a digital video camera. In addition, an imaging range SR of the camera 23 includes at least an irradiation range of the radiation Ra. In the radiographic system 20, an image (including a motion picture as a collection of still images; hereinafter, referred to as a camera image) captured using the camera 23 is used for recognition of the direction and/or laterality of the subject Obj in radiography. The camera image and the like will be described below.

The console 24 is a main control device (so-called computer) of the radiographic system 20, for example, to control the radiographic system 20 or to perform mutual communicate with a radiology information system (RIS) 31, a hospital information system (HIS) 32, or other external systems. The console 24 acquires an imaging order from the RIS 31 or the HIS 32, and acquires a radiation image output from the radiographic unit 22 to transmit it to each unit.

Figure 2:
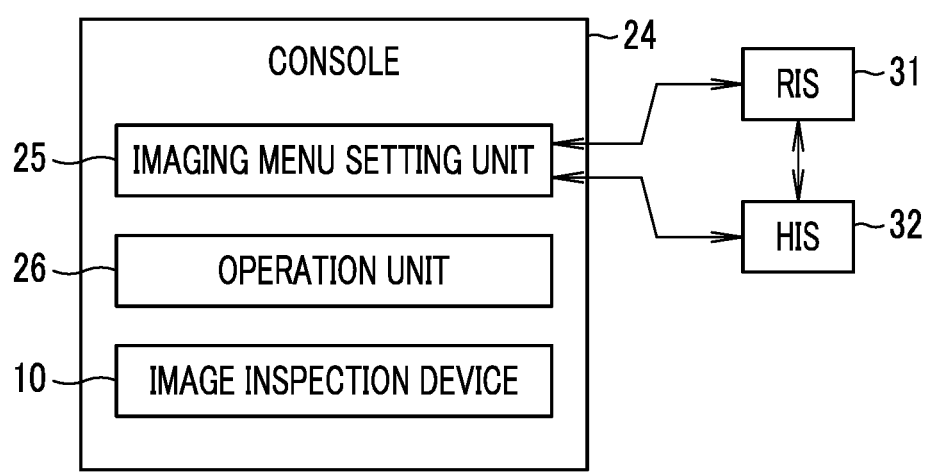
FIG. 2 is a block diagram showing a function of a console.
Figure 3:
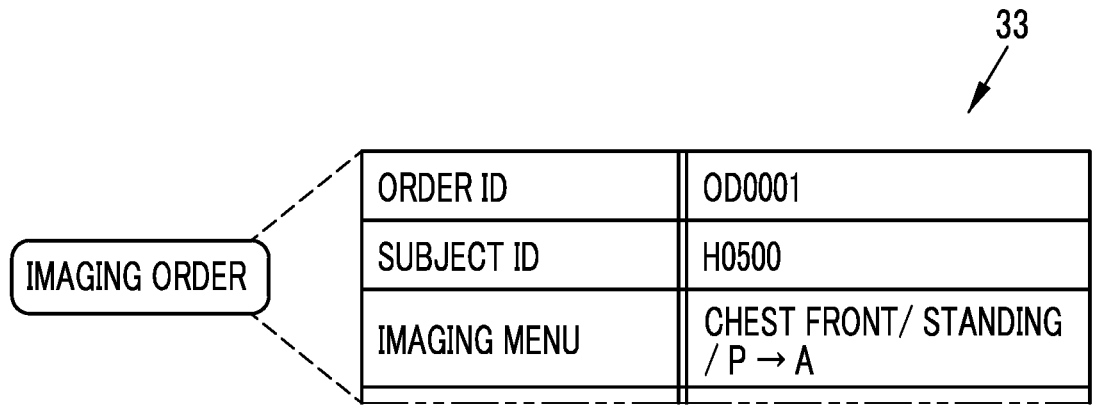
FIG. 3 is an explanatory diagram showing an imaging order and an imaging menu.

As shown in FIG. 2, the console 24 comprises an imaging menu setting unit 25, an operation unit 26, and an image inspection device 10. The imaging menu setting unit 25 acquires an imaging order by manual input or from the MS 31, HIS 32, or other external systems. Then, an imaging menu is set according to the acquired imaging order. As shown in FIG. 3, an imaging order 33 is a request for radiography, and includes, for example, information for specifying an order such as "order ID", information for specifying the subject Obj such as "subject ID" (identification number of a subject being tested who is the subject Obj), and information for specifying an imaging part and imaging direction of the subject Obj such as "imaging menu".

The imaging menu is a menu showing specific imaging items, and is set according to the imaging order. For example, in a case where the imaging order is "imaging request for each one of chest front (P→A) and chest front (A→P) of the specific subject Obj", the imaging menu setting unit 25 sets "chest front (P→A)" and "chest front (A→P)" as the imaging menu for the specific subject Obj. The term "chest front (P→A)" means a menu in which the radiation Ra is emitted from the rear surface (posterior) toward the front surface (anterior) of the subject Obj to image the chest of the subject Obj from the front. In addition, the term "chest front (A→P)" means a menu in which the radiation Ra is emitted from the front surface toward the rear surface of the subject Obj to image the chest of the subject Obj from the front. In FIG. 3, in the "imaging order", the "order ID" is "OD0001", the "subject ID" is "H500", and the "imaging menu" is "chest front/standing/P→A".

The operation unit 26 is, for example, a keyboard and/or a pointing device used for setting input of the imaging conditions and the like and for operating the radiation source 21 and the radiographic unit 22. The operation unit 26 may be constituted by a touch panel. In addition, the imaging menu can be set or changed by an operation of the operation unit 26.

The image inspection device 10 may have a communication function, and may communicate with the imaging menu setting unit 25 or the operation unit 26 of the console 24, an external device, or the like. Therefore, data and the like may be transmitted and received between the imaging menu setting unit 25 or the operation unit 26 of the console 24, an external device, or the like and the image inspection device 10.

Figure 4:
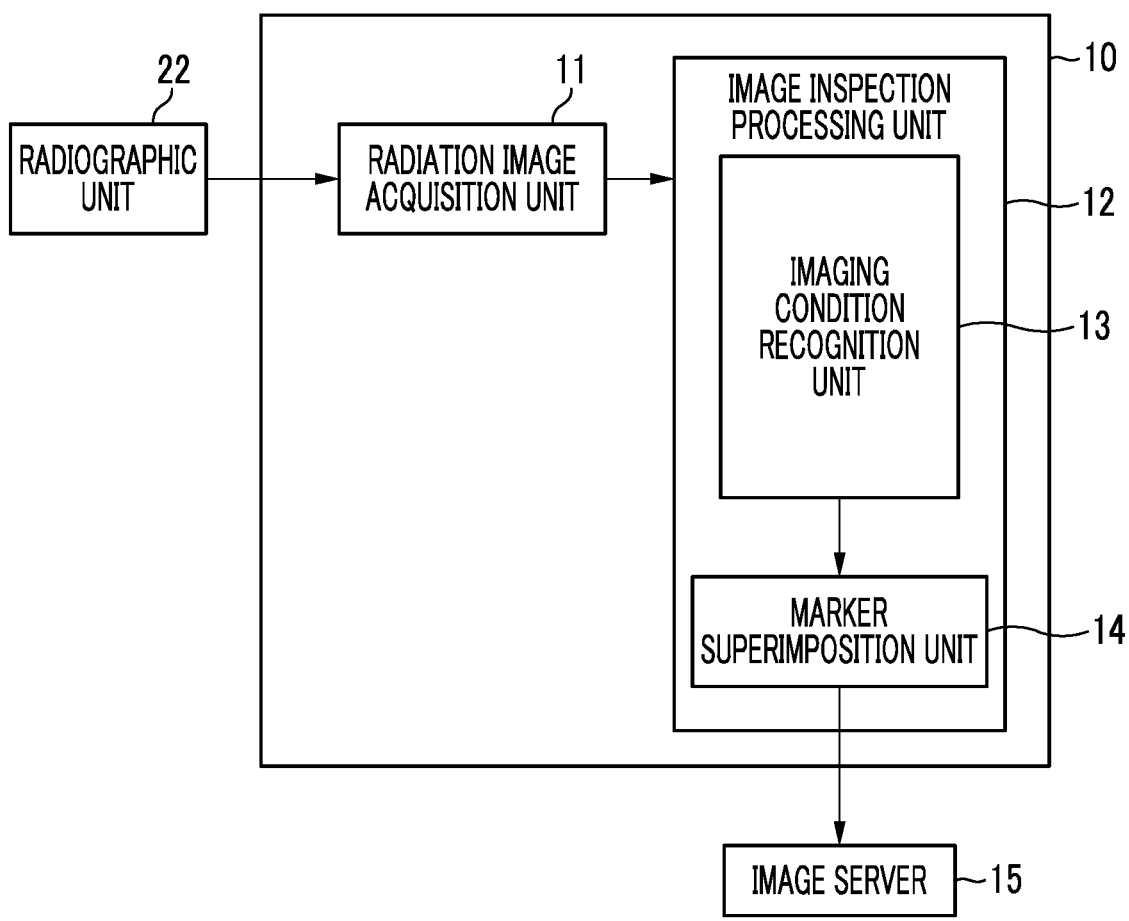
FIG. 4 is a block diagram showing a function of an image inspection device comprising an imaging condition recognition unit.

As shown in FIG. 4, the image inspection device 10 comprises a radiation image acquisition unit 11 and an image inspection processing unit 12. In the image inspection device 10, programs relating to the radiation image acquisition unit 11, the image inspection processing unit 12, and the like are incorporated in a memory (not shown). The programs are operated by a control unit (not shown) composed of a processor, whereby the functions of the radiation image acquisition unit 11 and the image inspection processing unit 12 are realized. The image inspection processing unit 12 comprises an imaging condition recognition unit 13 and a marker superimposition unit 14. The radiation image acquisition unit 11 acquires a radiation image 16 via the imaging menu setting unit 25 included in the console 24. The imaging condition recognition unit 13 recognizes an imaging condition relating to an imaging direction and/or laterality of the subject reflected in the radiation image 16. The marker superimposition unit 14 superimposes, on the radiation image 16, a marker indicating the imaging direction and/or laterality of the subject reflected in the radiation image 16 by using the recognition result of the imaging condition recognition unit 13. The radiation image 16 on which the marker is superimposed is sent to an image server 15 or the like.

Hereinafter, each unit of the image inspection device 10 and the like will be described in detail. The radiation image acquisition unit 11 acquires the radiation image 16 output by the radiographic unit 22 through, for example, the imaging menu setting unit 25. The radiation image 16 acquired here may be not only a medical image suitable for diagnosis but also a medical image unsuitable for diagnosis for various reasons. In addition, it may be difficult to determine the imaging direction and/or laterality of the subject. Therefore, an image inspection step is performed on the radiation image 16 in order to obtain a medical image suitable for diagnosis. The image inspection step may include a plurality of steps.

In the present embodiment, the image inspection step includes five steps of: defective image determination for determining imaging failure; adjustment of a density and a contrast; adjustment of an angle of the subject reflected in the radiation image; trimming for cutting out a part relating to diagnosis or the like; and superimposition of a marker indicating an imaging direction and/or laterality of the subject reflected in the radiation image. The radiation image 16 for which the image inspection step has been completed is used for diagnosis or the like.

The radiation image 16 acquired by the radiation image acquisition unit 11 is sent to the imaging condition recognition unit 13 of the image inspection processing unit 12. The imaging condition recognition unit 13 recognizes an imaging condition (hereinafter, referred to as a directional imaging condition) relating to the imaging direction and/or laterality of the subject reflected in the radiation image 16 in order to automate a step of superimposing the marker indicating the imaging direction and/or laterality of the subject reflected in the radiation image 16 in the image inspection step. The directional imaging condition is a condition for superimposing, on the radiation image 16, the marker indicating the imaging direction and/or laterality of the subject reflected in the radiation image 16. The marker superimposition unit 14 superimposes the marker on the radiation image 16 based on the recognition result obtained by recognizing the directional imaging condition of the subject reflected in the radiation image 16 by the imaging condition recognition unit 13.

The imaging direction of the subject reflected in the radiation image 16 refers to an orientation of the subject in a case where the subject is arranged with respect to the radiographic unit 22. In a case where the subject is a person, it is the direction of the patient or the patient orientation. The laterality of the subject reflected in the radiation image 16 is a distinction between imaging of a right portion of the subject and imaging of a left portion of the subject. The patient orientation is described in digital imaging and communications in medicine (DICOM) standard ("Annex A: Explanation of patient orientation").

Figure 5:
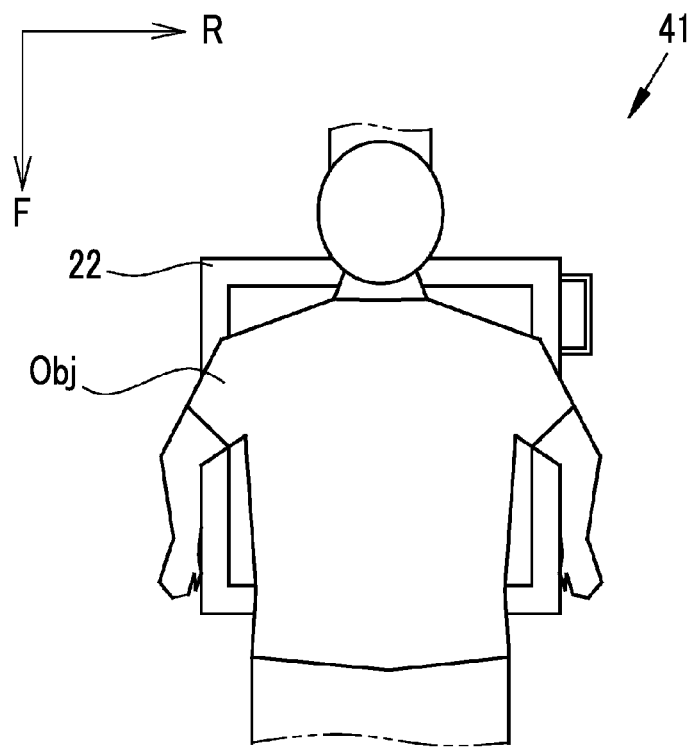
FIG. 5 is an explanatory diagram showing an imaging direction (P→A) of a subject.
Figure 6:
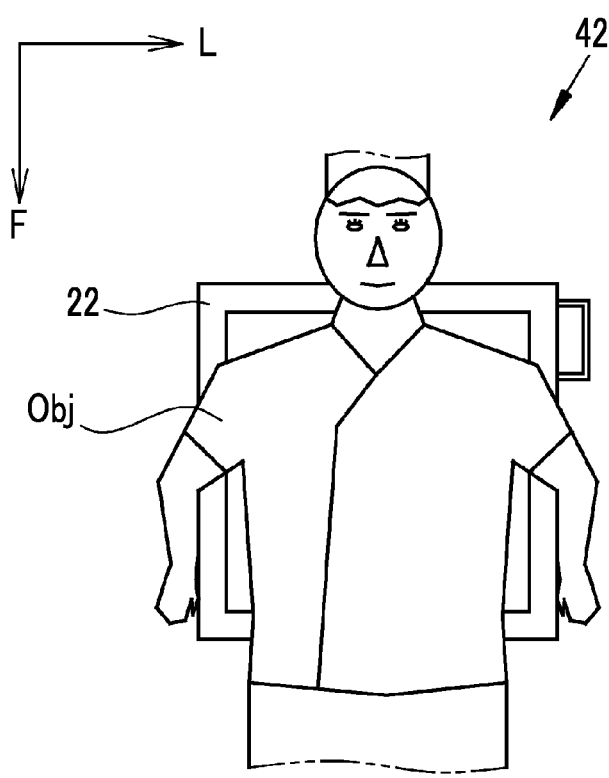
FIG. 6 is an explanatory diagram showing an imaging direction (A→P) of the subject.

For example, as shown in FIGS. 5 and 6, in a case where the subject is a person, the radiation source 21 is in front of the paper surface of FIGS. 5 and 6, the radiographic unit 22 is in the depth direction of the paper surface, and the front of the chest of the subject Obj is imaged in a standing position, in a case 41 shown in FIG. 5, the directional imaging condition is "chest front (P→A)" in which the subject Obj is arranged such that the front surface thereof faces the radiographic unit 22. As the patient orientation, the lower direction of the paper surface is"F" (foot) and the right direction of the paper surface is "R" (right). On the other hand, in a case 42 shown in FIG. 6, the directional imaging condition is "chest front (A→P)" in which the subject Obj is arranged so as to face the radiographic unit 22 on the back. As the patient orientation, the lower direction of the paper surface is"F" (foot), and the right direction of the paper surface is "L" (left). As described above, among the directional imaging conditions of the subject reflected in the radiation image 16 of the chest front image, the imaging direction is "P→A" in the case 41 shown in FIG. 5 and is "A→P" in the case 42 shown in FIG. 6.

Figure 7:
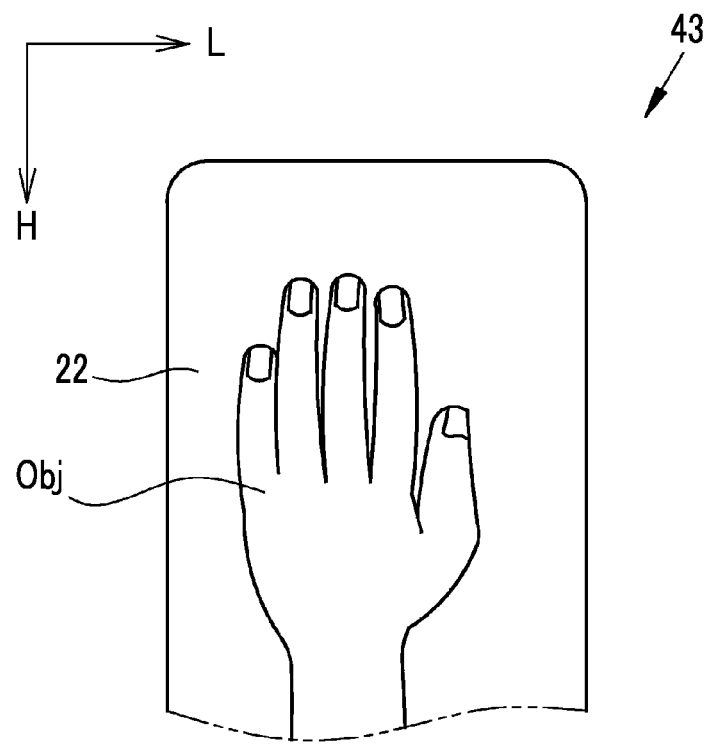
FIG. 7 is an explanatory diagram showing laterality (left hand) of the subject.
Figure 8:
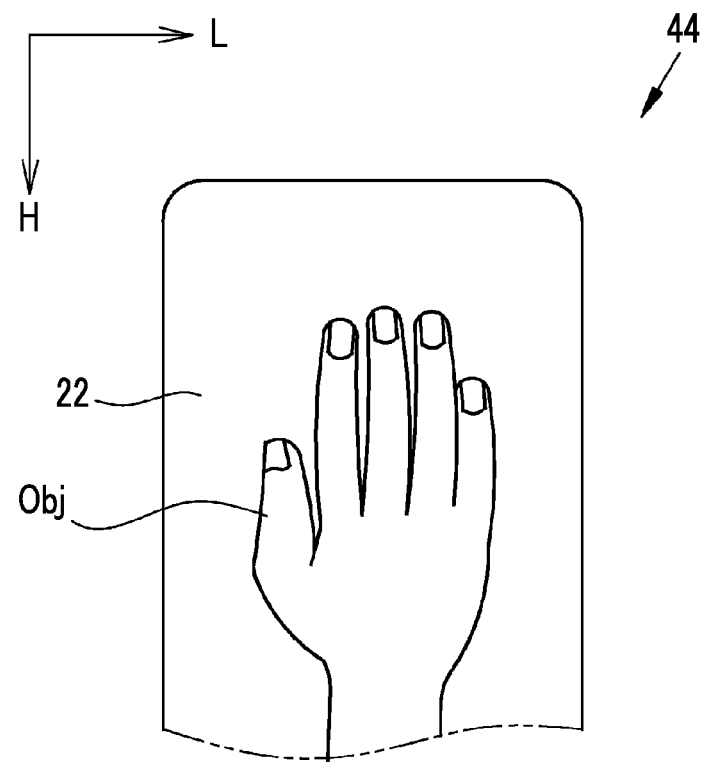
FIG. 8 is an explanatory diagram showing laterality (right hand) of the subject.

In addition, as shown in FIGS. 7 and 8, for example, in a case where the subject is a person, the radiation source 21 is in front of the paper surface of FIGS. 7 and 8, the radiographic unit 22 is in the depth direction of the paper surface, and a hand of the person is imaged as the subject Obj, in a case 43 shown in FIG. 7, a left hand is arranged such that a palm faces the radiographic unit 22, that is, in a pronation position, and in a case 44 shown in FIG. 8, a right hand is arranged such that a palm faces the radiographic unit 22, that is, in a pronation position. Therefore, in the case 43 and the case 44, since the radiation Ra is emitted from the rear surface to the front surface of the subject Obj to image the subject Obj from the front, the imaging direction is "P→A". In the case 43 shown in FIG. 7, as the patient orientation, the lower direction of the paper surface is "H" (head) and the right direction of the paper surface is "L" (left), while in the case 44 shown in FIG. 8, as the patient orientation, the lower direction of the paper surface is "H" (head) and the right direction of the paper surface is "L". As described above, as the directional imaging condition of the subject reflected in the radiation image 16, in the case 43, the imaging direction is "P→A", the laterality is left or left hand, and in the case 44, the imaging direction is "P→A", and the laterality is right or right hand.

As a method by which the imaging condition recognition unit 13 recognizes the directional imaging condition of the subject reflected in the radiation image 16, a known method can be used as long as it can recognize the directional imaging condition of the subject reflected in the radiation image 16. For example, there is a method of using correspondence information in which the radiation image 16 and the directional imaging condition of the subject reflected in the radiation image 16 are associated with each other in advance. That is, the directional imaging condition of the radiation image 16 acquired by the radiation image acquisition unit 11 is estimated using the radiation image 16 and the correspondence information, and the estimated directional imaging condition is used as the recognition result of the directional imaging condition of the radiation image 16. In the estimation, a known image analysis technique, image recognition technique, image processing technique, or the like can be used, and specifically, for example, a method of extracting and using feature points by image processing of the radiation image 16, a method by machine learning, and the like can be used.

Figure 9:
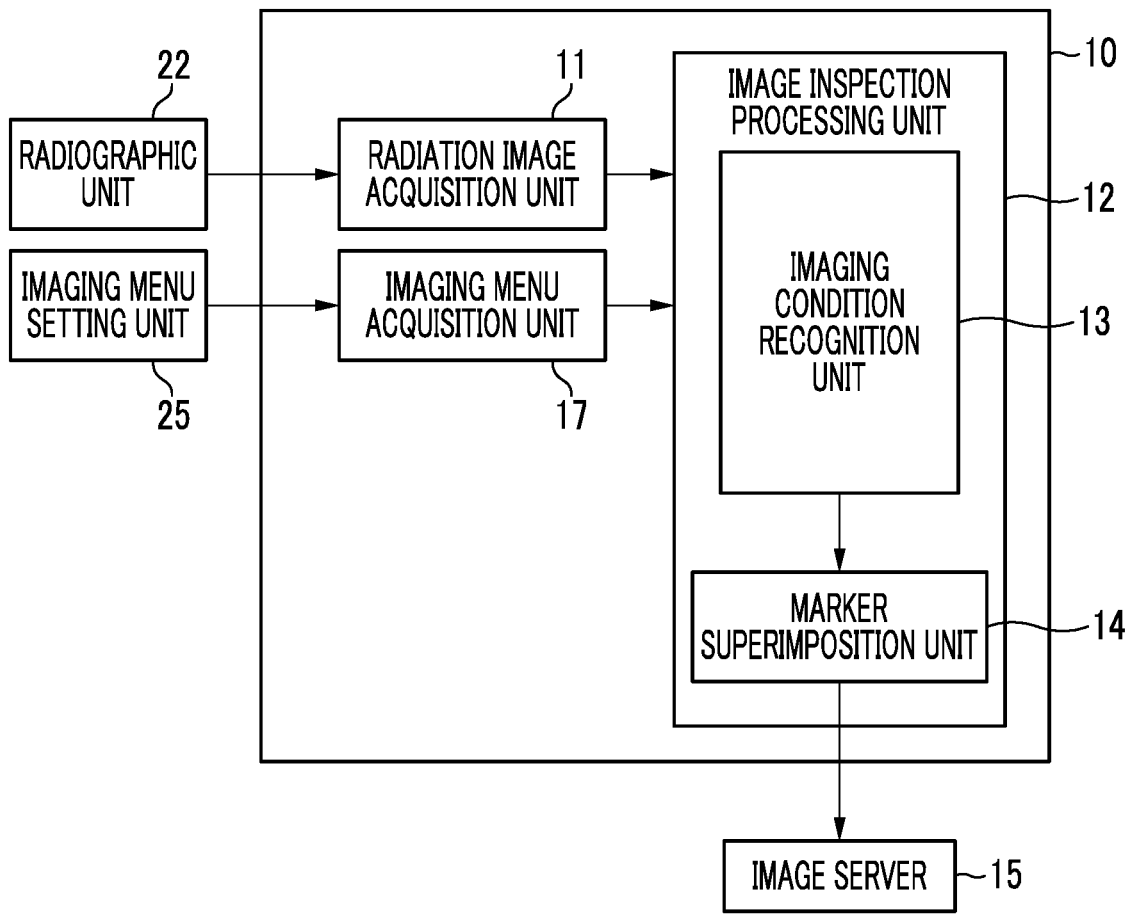
FIG. 9 is a block diagram showing a function of an image inspection device comprising an imaging menu acquisition unit.

An imaging menu relating to capturing of the radiation image 16 may be acquired, and the directional imaging condition may be recognized by using the imaging menu and the radiation image 16. As shown in FIG. 9, the image inspection device 10 may comprise an imaging menu acquisition unit 17. The imaging menu acquisition unit 17 acquires an imaging menu 17a relating to capturing of the radiation image 16 via the imaging menu setting unit 25 included in the console 24 of the radiographic system 20 connected to the image inspection device 10. Then, the imaging direction of the subject or the laterality of the subject included in the imaging menu 17a is acquired. In this case, the directional imaging condition is recognized from the subject reflected in the radiation image 16 and compared with the imaging direction of the subject or the laterality of the subject included in the imaging menu 17a, and then the directional imaging condition of the radiation image 16 is set. For example, in a case where the imaging menu 17a is "chest front/standing/P→A" and the directional imaging condition of the subject reflected in the radiation image 16 is recognized as "P→A" (see FIG. 3), the imaging condition recognition unit 13 recognizes the imaging direction as "P→A" among the directional imaging conditions.

Figure 10:
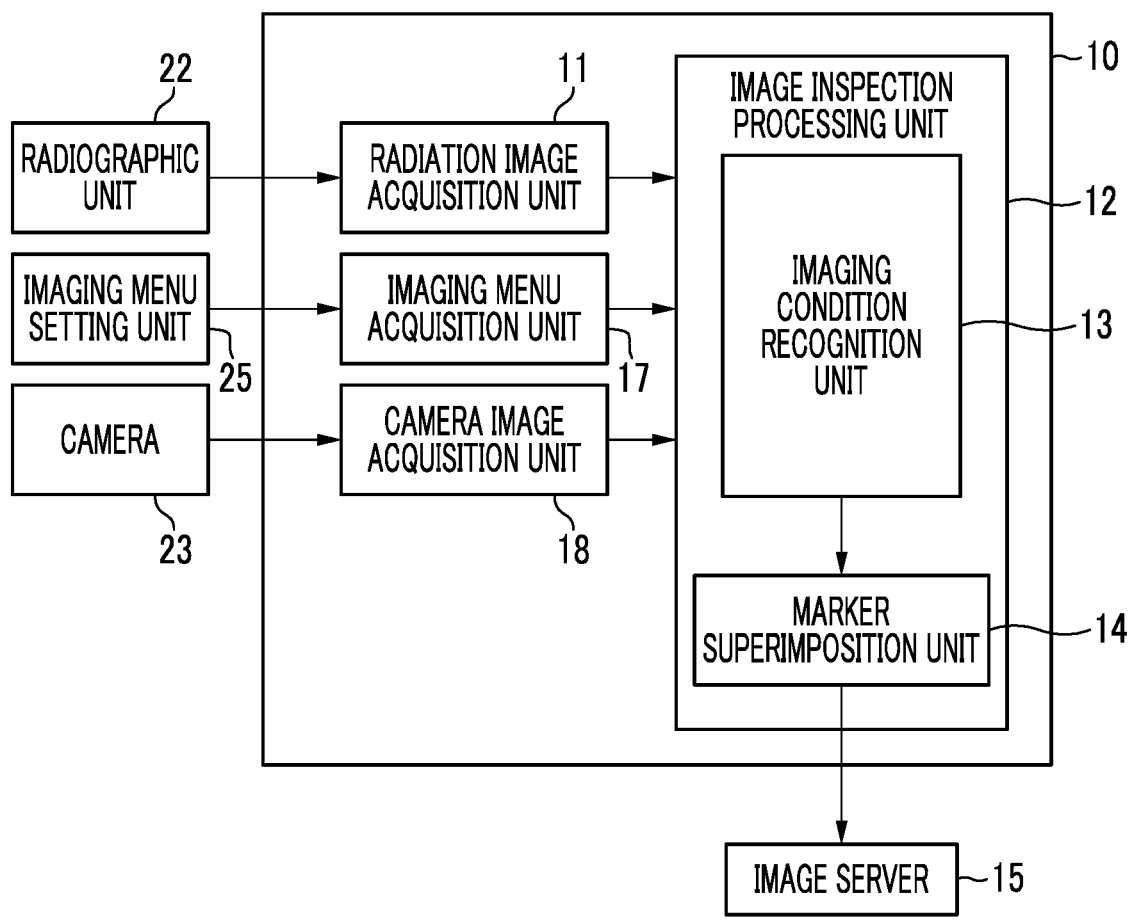
FIG. 10 is a block diagram showing a function of an image inspection device comprising a camera image acquisition unit.

Before radiography for obtaining the radiation image 16, a camera image obtained by imaging the subject Obj by a method different from the radiography may be acquired, and the directional imaging condition may be recognized by using the camera image. As shown in FIG. 10, the image inspection device 10 may comprise a camera image acquisition unit 18 that acquires a camera image 18a. The radiographic system 20 comprises a camera 23 that acquires the camera image 18a. The camera 23 is controlled by the console 24. The camera image acquisition unit 18 included in the image inspection device 10 acquires the camera image 18a acquired by the camera 23. The imaging condition recognition unit 13 recognizes the directional imaging condition of the subject Obj by using the acquired camera image 18a.

In the present embodiment, the camera 23 is a digital video camera, and the subject Obj is imaged using visible light. In order to recognize the directional imaging condition of the subject using the camera image 18a, the camera image 18a includes a part or the whole of the subject Obj to the extent that the recognition processing can be performed. Although the camera 23 is randomly arranged as long as it is within a range in which the directional imaging condition of the subject can be recognized by using the camera image 18a, in the present embodiment, the camera 23 is provided substantially integrally with the radiation source 21. This is to surely image the subject Obj without excess or deficiency to the extent that the above recognition processing can be performed, since the subject Obj is arranged in the irradiation range of the radiation Ra.

As a method by which the imaging condition recognition unit 13 recognizes the directional imaging condition of the subject Obj by using the camera image 18a, a known method can be used as long as it can recognize the directional imaging condition of the subject reflected in the camera image 18a. For example, there is a method of using correspondence information in which the camera image 18a and the directional imaging condition of the subject reflected in the camera image 18a are associated with each other in advance. That is, the directional imaging condition of the acquired camera image 18a can be estimated using the correspondence information in which the camera image 18a and the directional imaging condition of the subject reflected in the radiation image 16 are associated with each other in advance, and the estimated directional imaging condition can be used as the recognition result of the directional imaging condition of the camera image 18a. In comparison of the camera image 18a, a known image analysis technique, image recognition technique, or image processing technique, more specifically, for example, a method of extracting and using feature points by image processing of the camera image 18a, a method by machine learning, and the like can be used.

Regarding the acquisition of the camera image 18a, the directional imaging condition need only be acquired. Therefore, in addition to before radiography, it may be during radiography or after radiography. Although it is preferable that the acquisition of the radiation image 16 and the acquisition of the camera image 18a are not separated from each other in time as much as possible so that the directional imaging condition of the subject in the radiation image 16 and the directional imaging condition of the subject in the camera image 18a do not differ from each other, the directional imaging condition need only be acquired, and strictness in time does not matter.

The recognition of the directional imaging condition of the subject reflected in the radiation image 16 may be a final recognition result by combining a plurality of the recognition results obtained by the above-described method or the like. For example, the result of the image analysis of the radiation image 16, the result of the image analysis of the camera image 18a, and the result from the imaging menu 17a may be compared, and then the result may be used as the final recognition result. By combining a plurality of recognition means, it is possible to more accurately obtain the recognition result of the directional imaging condition of the subject reflected in the radiation image 16.

The marker superimposition unit 14 superimposes, on the radiation image 16, a marker indicating the directional imaging condition of the subject Obj reflected in the radiation image 16 by using the recognition result obtained by recognizing the directional imaging condition by the imaging condition recognition unit 13. As the marker to be superimposed, a commonly used marker indicating the directional imaging condition of the subject on the radiation image 16 is used. For example, "A→P" or "AP", "P→A" or "PA", "standing", "supine", or "side-lying", "R" or "L", or "right hand" or "left hand" is used.

It is preferable that a position on the radiation image 16 on which the marker is superimposed (hereinafter, referred to as a marker superimposition position) is such that it is easy for the doctor to recognize the marker in a case where the doctor performs diagnosis based on the radiation image 16 and that it does not cause a problem in the diagnosis. Therefore, the marker superimposition position may be set in advance at any of the four corners of the radiation image 16 or the like, or may be determined for each radiation image 16. In addition, the number of the markers to be superimposed may be one or more. In a case where there are a plurality of the markers, the marker superimposition positions may be the same or different.

Figure 11:
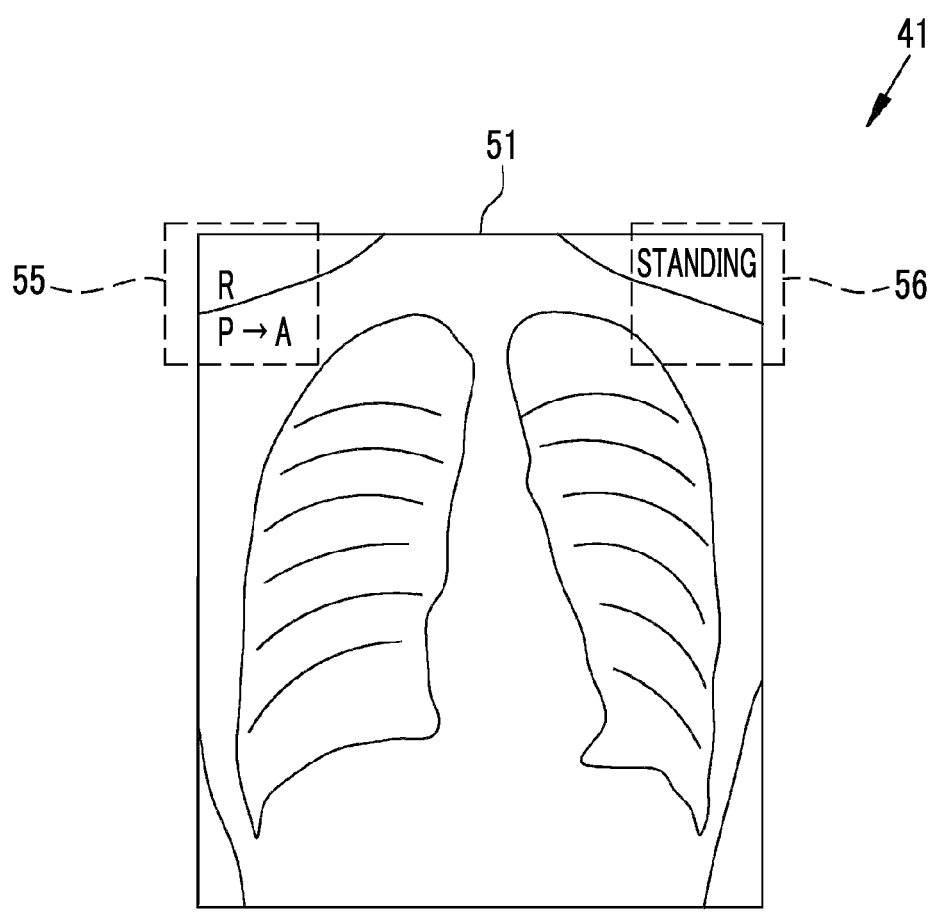
FIG. 11 is an image diagram showing a marker superimposition position in a case 41.
Figure 12:
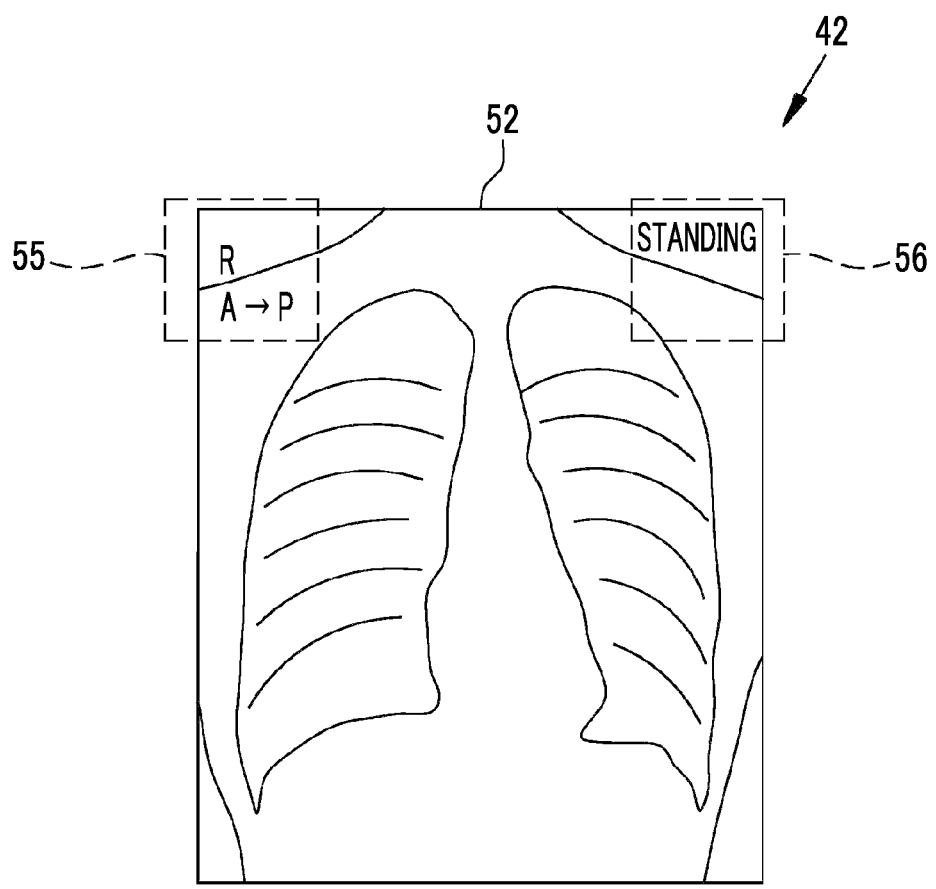
FIG. 12 is an image diagram showing a marker superimposition position in a case 42.

For example, as shown in FIG. 11, in the case 41, in a radiation image 51 acquired in the case 41, the marker superimposition unit 14 respectively superimposes, on an upper left end portion 55 and an upper right end portion 56 toward the radiation image 51, "R, P→A" and "standing" which are markers indicating the imaging direction and/or laterality of the subject reflected in the radiation image 51, by the recognition result of the imaging condition recognition unit 13. In addition, for example, as shown in FIG. 12, in the case 42, similarly, in a radiation image 52 acquired in the case 42, the marker superimposition unit 14 respectively superimposes, on an upper left end portion 55 and an upper right end portion 56, "R, A→P" and "standing" which are markers indicating the imaging direction and/or laterality of the subject reflected in the radiation image 52.

Figure 13:
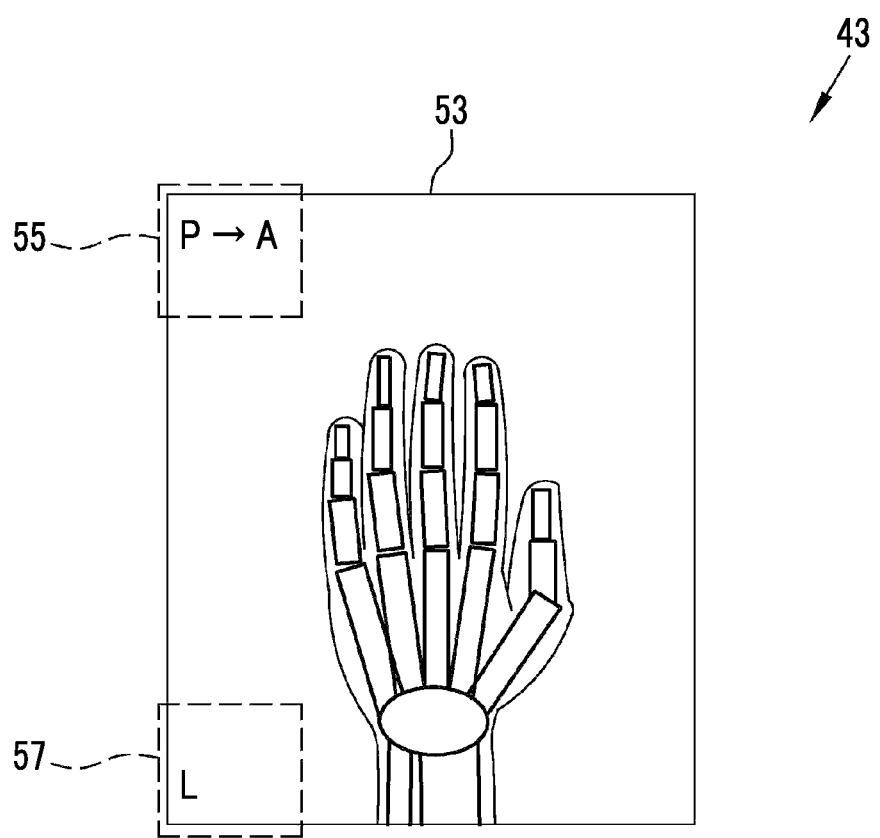
FIG. 13 is an image diagram showing a marker superimposition position in a case 43.
Figure 14:
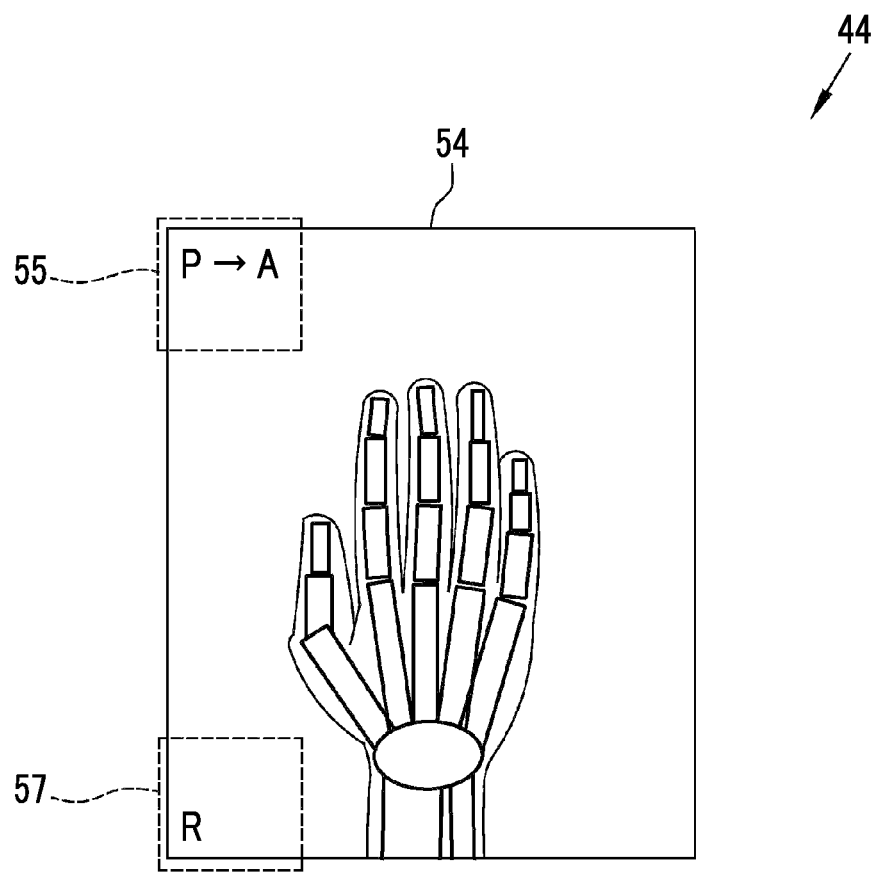
FIG. 14 is an image diagram showing a marker superimposition position in a case 44.

In addition, for example, as shown in FIG. 13, in the case 43, similarly, in a radiation image 53 acquired in the case 43, the marker superimposition unit 14 respectively superimposes, on an upper left end portion 55 and a lower left end portion 57, "P→A" which is a marker indicating the imaging direction and/or laterality of the subject reflected in the radiation image 53 and "L" indicating a left hand. In addition, for example, as shown in FIG. 14, in the case 44, similarly, in a radiation image 54 acquired in the case 44, the marker superimposition unit 14 respectively superimposes, on an upper left end portion 55 and a lower left end portion 57, "P→A" which is a marker indicating the imaging direction and/or laterality of the subject reflected in the radiation image 54 and "R" indicating a right hand.

Figure 15:
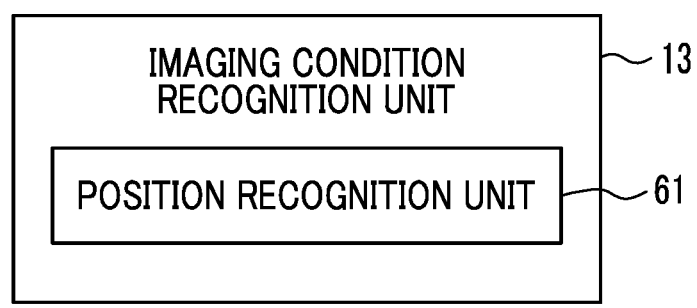
FIG. 15 is a block diagram showing a function of the imaging condition recognition unit.

In a case where the position of the marker is determined for each radiation image 16 and superimposed, as shown in FIG. 15, the imaging condition recognition unit 13 may comprise a position recognition unit 61. The position recognition unit 61 recognizes a position where the marker superimposition unit 14 superimpose the marker on the radiation image 16 by using the radiation image 16. The marker superimposition unit 14 superimposes the marker on the position recognized by the position recognition unit 61, or moves the marker to the position.

It is preferable that the position recognition unit 61 recognizes a position on the radiation image 16 such that there is no problem in a case where the doctor performs diagnosis using the radiation image 16 and the doctor does not miss the marker. Therefore, the position recognition unit 61 can recognize various positions depending on the subject or the like reflected in the radiation image 16. The positions recognized by the position recognition unit 61 may be, for example, the four corners of the radiation image 16 or a portion on the radiation image 16 where the subject is not reflected.

As a method by which the position recognition unit 61 recognizes the position on which the marker is to be superimposed by using the radiation image 16, a known method can be used as long as it can recognize the subject reflected in the radiation image 16. For example, there is a method of using correspondence information in which the imaging menu 17a, the radiation image 16, and the position where the marker is to be superimposed are associated with each other in advance. That is, the position where the marker is to be superimposed is estimated by using the radiation image 16 and the correspondence information, and the estimated marker superimposition position is used as the marker superimposition position recognized by the position recognition unit 61. In the estimation, a known image analysis technique, image recognition technique, image processing technique, or the like can be used, and specifically, for example, a method of extracting and using feature points by image processing of the radiation image 16, a method by machine learning, and the like can be used.

As the method by machine learning, a learning model may be generated and this learning model may be used as the correspondence information. For example, after estimating the position where the marker is to be superimposed by using the radiation image 16 and the correspondence information, a result of the estimation is evaluated, and evaluation information is given to the estimated position where the marker is to be superimposed. Then, a learning model is generated based on the correspondence information in which the imaging menu 17*a*, the radiation image 16, and the position where the marker is to be superimposed are correlated in a case where a certain level or higher of the evaluation information is given. The radiation image 16 in this correspondence information is preferably a radiation image 16 that is not defective.

By using the correspondence information in which the imaging menu 17*a*, the radiation image 16, and the position where the marker is to be superimposed are associated with each other in advance, and further by generating a learning model and using the learning model as the correspondence information, for example, in the radiation image 16, it is possible to superimpose the marker on an optimum marker superimposition position according to each imaging menu 17*a*, instead of simply setting a portion where the subject Obj is not reflected as a marker superimposition position. In the method in which the position recognition unit 61 recognizes the position where the marker is to be superimposed by using the radiation image 16, the imaging menu 17*a*, the camera image 18*a*, and the like may be used in addition to the radiation image 16.

Figure 16:
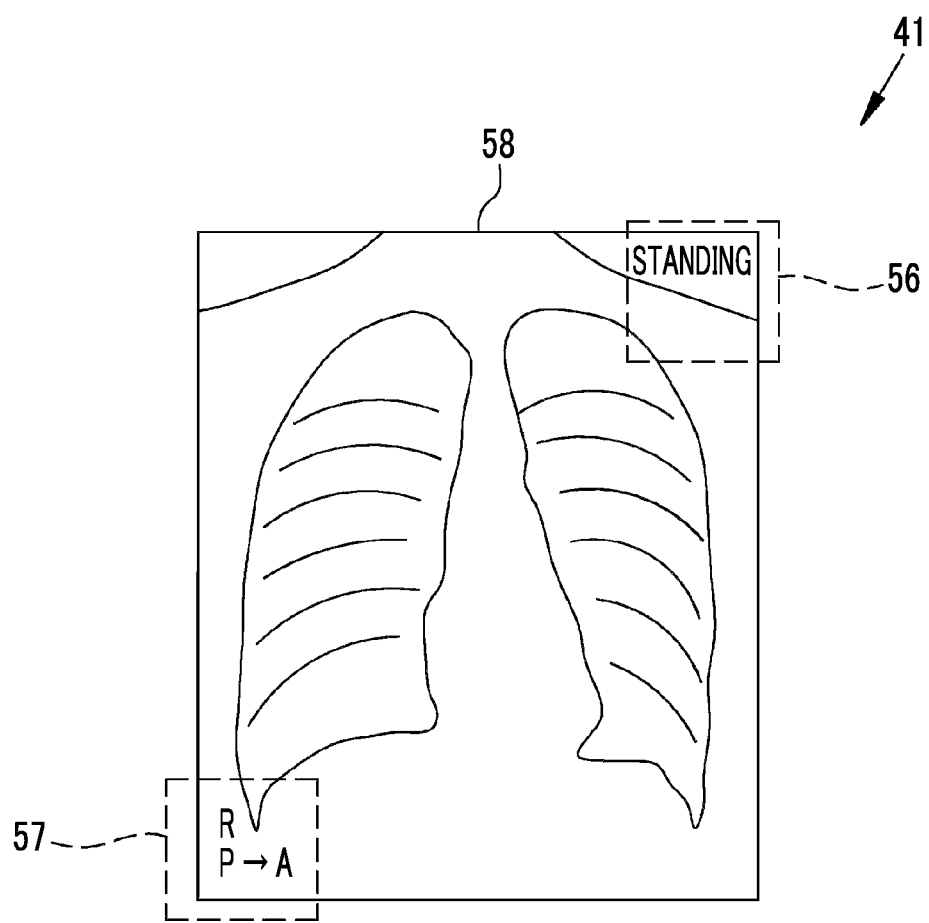
FIG. 16 is an image diagram showing a change in a marker superimposition position.

As shown in FIG. 16, in a case where an upper right end portion 56 and a lower left end portion 57 are recognized as the position where the marker superimposition unit 14 superimposes the marker by using the radiation image 16 acquired in the case 41, a radiation image 58 becomes a radiation image in which "R, P→A" which is a directional imaging condition is superimposed on the lower left end portion 57 and "standing" which is a directional imaging condition is superimposed on the upper right end portion 56. Even in the radiation image 51 on which the marker is already superimposed by the marker superimposition unit 14, in a case where the position recognition unit 61 recognizes the position, the marker superimposed on the radiation image 51 may be moved and superimposed in some cases. For example, in the case 41, in a case where the markers are superimposed on the upper left end portion 55 and the upper right end portion 56 as in the radiation image 51 (see FIG. 11), after the position recognition unit 61 recognizes the lower left end portion 57 as the marker superimposition position, the marker superimposition unit 14 moves the marker of the upper left end portion 55 from the upper left end portion 55 to a position of the lower left end portion 57.

As described above, according to the image inspection device or the radiographic system, a marker indicating the imaging direction and/or laterality of the subject can be automatically superimposed on the radiation image. In addition, in performing the image inspection step of superimposing the marker, an artificial mistake or the like is suppressed, and the marker can be accurately superimposed on the radiation image 16 by using the recognition result of the imaging condition recognition unit 13. Therefore, the workload of the image inspection step can be reduced.

As the image inspection step, defective image determination for determining imaging failure or the necessity of re-imaging for the radiation image may be performed. In a case where an defective image determination unit that performs defective image determination for determining the necessity of re-imaging for the radiation image is provided, the imaging condition recognition unit recognizes the imaging condition for the radiation image for which re-imaging is determined to be unnecessary in the defective image determination, and the marker superimposition unit superimposes the marker on the radiation image for which re-imaging is determined to be unnecessary in the defective image determination.

Figure 17:
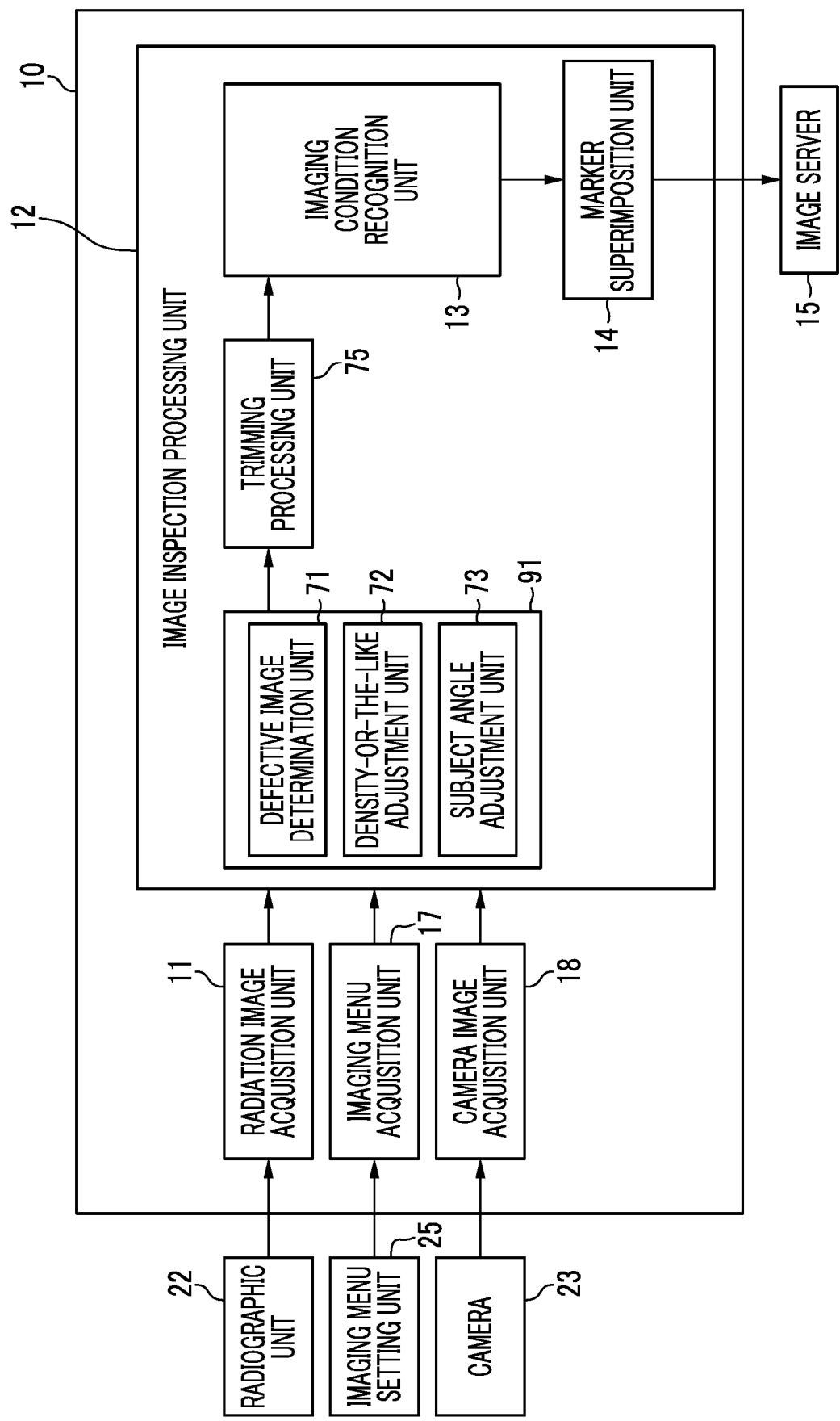
FIG. 17 is a block diagram showing a function of an image inspection device including various image inspection steps.

As shown in FIG. 17, in a case where the image inspection processing unit 12 comprises an defective image determination unit 71 that performs defective image determination for the radiation image 16, the marker superimposition unit 14 superimposes the marker on the radiation image 16 for which re-imaging is determined to be unnecessary in the defective image determination by using the recognition result by the imaging condition recognition unit 13. The imaging condition recognition unit 13 recognizes the imaging condition for the radiation image 16 for which re-imaging is determined to be unnecessary in the defective image determination before or after the acquisition of the radiation image 16.

In imaging of the radiation image, imaging failure may occur (referred to as defective image) due to mispositioning of the patient, body movement or insufficient breath of the patient, setting error of the imaging condition, or detection of foreign matter. As a method of the defective image determination, a known image analysis technique, image recognition technique, image processing technique, or the like can be used. In the present embodiment, for example, the determination is performed using a learned model or the like which has been learned about the radiation image 51 acquired in the past. By using the learned model, it is possible to perform the determination based on a criterion determined by learning. In addition, the determination result can be obtained in a short time.

As the learned model, for example, an algorithm or a library having a favorable determination result for image processing can be used. An algorithm or a library for obtaining a favorable determination result for the radiation image 51 may be constructed and used. As learning data, data in which at least information indicating whether or not the image is defective is attached to the radiation image 51 acquired in the past may be used. In addition, data in which any information from among imaging data, which is accessory information relating to the radiation image 51, patient data, and the like is attached to the radiation image 51 may be used. In addition, data in which the feature amount is selected according to the type or the like of the radiation image 51, and information on the feature amount is attached to the radiation image 51 may be used.

In addition to the learned model, other well-known machine learning techniques or image processing techniques other than the machine learning techniques may be used as long as the determination can be made according to a certain criterion. In addition, a plurality of the learned models and the image processing techniques other than the machine learning techniques may be used, and preferred ones may be selected depending on the type of the part or the like of the radiation image 51 or the accuracy of the determination result. The criterion for determination may be set in advance. For example, the criterion is set to be strict or loose depending on the purpose of the radiation image 51. More specifically, for example, in the radiation image 51, a threshold value is set in advance for a deviation in drawing of a point portion in determining whether or not the imaging is successful in accordance with the imaging menu, and the criterion can be made stricter by making this threshold value smaller, while the criterion can be made looser by making this threshold value larger. Therefore, a desired determination criterion can be set according to the medical institution. In addition, the determination criterion can be set differently for each clinical department such as emergency department, internal medicine department, or surgery department even in the same medical institution, or for each imaging area even in the same internal medicine department, or for each purpose such as educational purposes for a criterion for an operator to determine a defective image. In addition, the setting of the determination criterion may be changeable.

As the image inspection step, a step of adjusting a density and/or contrast of the radiation image may be performed. In a case where a density-or-the-like adjustment unit that adjusts the density and/or contrast of the radiation image is provided, the imaging condition recognition unit recognizes the imaging condition for the radiation image whose density and/or contrast is adjusted, and the marker superimposition unit superimposes the marker on the radiation image whose density and/or contrast is adjusted.

As shown in FIG. 17, in a case where a density-or-the-like adjustment unit 72 that adjusts the density and/or contrast of the radiation image 16 is provided, the marker superimposition unit 14 superimposes the marker on the radiation image 16 whose density and/or contrast is adjusted by using the recognition result by the imaging condition recognition unit 13. The imaging condition recognition unit 13 recognizes the imaging condition of the radiation image 16 whose density and/or contrast is adjusted before or after the acquisition of the radiation image 16.

The density and/or contrast can be adjusted using a known image analysis technique, image recognition technique, image processing technique, or the like, and is adjusted to a set density and/or contrast by using, for example, a known conversion function or the like for the radiation image 16. A value of the density and/or contrast to be adjusted may be set for each subject Obj reflected in the radiation image 16, imaging menu, or other information.

In addition, as the image inspection step, a step of adjusting an angle of the subject reflected in the radiation image may be performed. In a case where a subject angle adjustment unit that adjusts the angle of the subject in the radiation image is provided, the imaging condition recognition unit recognizes the imaging condition for the radiation image in which the angle of the subject is adjusted, and the marker superimposition unit superimposes the marker on the radiation image in which the angle of the subject is adjusted.

As shown in FIG. 17, in a case where a subject angle adjustment unit 73 that adjusts the angle of the subject in the radiation image 16 is provided, the marker superimposition unit 14 superimposes the marker on the radiation image 16 in which the angle of the subject is adjusted by using the recognition result by the imaging condition recognition unit 13. The imaging condition recognition unit 13 recognizes the imaging condition of the radiation image 16 in which the angle of the subject is adjusted before or after the acquisition of the radiation image 16.

The step of adjusting the angle of the subject reflected in the radiation image 16 is a step of rotating the radiation image 16 by an optional angle. Thereby, for example, depending on a state of the patient during imaging, in the radiation image 16 having a specific part as the subject, even though the radiation image 16 is captured in a direction different from the normal imaging direction, the radiation image 16 in which the subject is imaged in a direction easy for the doctor to perform examination can be obtained by the step of adjusting the angle of the subject.

In the step of adjusting the angle of the subject Obj reflected in the radiation image 16, A known image analysis technique, image recognition technique, image processing technique, or the like can be used, and after recognizing the subject reflected in the radiation image 16, the radiation image 16 is rotated by a specific angle so as to be in an appropriate subject direction.

For example, by using the camera image 18a, a positional relationship between the subject Obj and a sensor panel which is the radiation image acquisition unit 11 may be recognized by a known image recognition technique, whereby the angle of the subject reflected in the radiation image 16 may be adjusted. As the positional relationship between the subject Obj and the sensor panel, there are four following cases. First, there is a case where the sensor panel is in the normal orientation and the subject Obj is in the normal orientation. In this case, since the subject Obj reflected in the radiation image 16 is captured in the normal orientation, the step of adjusting the angle of the subject Obj is not performed. Second, there is a case where the sensor panel is in the abnormal orientation and the subject Obj is in the normal orientation. In this case, the radiation image 16 is corrected so that the sensor panel is oriented to be normal. As a result, first, the step of adjusting the angle of the subject Obj can be performed with reference to the sensor panel having the correct orientation. Third, there is a case where the sensor panel is in the normal orientation and the subject Obj is in the abnormal orientation. In this case, the angle of the subject Obj need only be adjusted with reference to the sensor panel. The fourth case is a combination of the second case and the third case. That is, neither the sensor panel and/nor the subject Obj is normal. In this case, for example, the angle of the subject of the radiation image 16 may be adjusted in accordance with a reference such as the normal orientation of the sensor panel. The normal orientation refers to an orientation normally used in the radiation image 16 in which the subject Obj is reflected. The orientation refers to a three-dimensional direction including a depth direction with respect to the radiation image 16 in addition to a vertical or horizontal two-dimensional direction with respect to the radiation image 16. Therefore, a case where the subject Obj is obliquely reflected in the depth direction of the radiation image 16 is also included.

The step of adjusting the angle of the subject reflected in the radiation image 16 is preferably performed by using a machine learning technique. That is, the angle of the subject may be adjusted by matching the subject Obj reflected in the radiation image 16 with the normal orientation of the sensor panel by comparing the shape of the sensor panel reflected in the radiation image 16 whose angle is to be adjusted with correspondence information in which the shape of the sensor panel in the camera image 18a, information on the normal orientation of the sensor panel, and the radiation image 16 are associated with each other in advance, using the correspondence information. In addition, as the correspondence information, information that the radiation image 16 of a specific part in the imaging order is acquired may also be used. By creating a learned model using these pieces of correspondence information, the angle of the subject in the radiation image 16 can be automatically adjusted according to the imaging order.

As shown in FIG. 18, as an example of the step of adjusting the angle of the subject reflected in the radiation image, for example, in a case where an image 81 before subject angle adjustment, which is a radiation image without the image inspection step, is an image of the left hand imaged in a direction in which the fingertip faces downward, subject angle adjustment 83, that is, rotation processing is automatically performed. As a result, the image 81 before subject angle adjustment becomes an image 82 after subject angle adjustment in an orientation used for the normal examination by the doctor, that is, the image 82 after subject angle adjustment of the left hand imaged in a direction in which the fingertip faces upward.

As the image inspection step, a trimming processing step of cutting out a portion relating to diagnosis of the radiation image or the like may be performed. In a case where a trimming processing unit that performs trimming processing for cutting out a part of the radiation image is provided, the imaging condition recognition unit recognizes the imaging condition for the radiation image after the trimming processing, and the marker superimposition unit superimposes the marker on the radiation image after the trimming processing. Examples of the portion relating to the diagnosis of the radiation image include a region of interest relating to the diagnosis, or a portion excluding a portion where the radiation image is unclear due to lack of X-rays and cannot be used for the diagnosis.

As shown in FIG. 17, in a case where a trimming processing unit 75 that performs the trimming processing for cutting out a part of the radiation image 16 is provided, the marker superimposition unit 14 superimposes the marker on the radiation image 16 after the trimming processing by using the recognition result by the imaging condition recognition unit 13. The imaging condition recognition unit 13 recognizes the imaging condition of the radiation image 16 after the trimming processing, before or after the acquisition of the radiation image 16.

Although a known image analysis technique, image recognition technique, image processing technique, or the like can be used for the trimming processing, it is preferable to use a machine learning technique. This is because, although in image analysis techniques other than machine learning, a method of determining a boundary of the irradiation field of radiation in the radiation image 16 and setting a trimming frame based on boundary information of the irradiation field is performed, the boundary of the irradiation field may be erroneously recognized in a case where the boundary of the irradiation field is not clear due to an effect of scattered rays or in a case where there is a steep change in density due to an artificial substance in the body.

As a method of performing the trimming processing by the machine learning technique, there is a method of generating a learned model by using correspondence information in which the imaging menu and the radiation image 16 that is not defective are associated with each other in advance. In the trimming processing performed here, the size of the radiation image 16 is not changed, that is, enlarged or reduced. Enlargement or reduction can be performed after the trimming processing.

As shown in FIG. 19, as an example of the trimming processing, for example, in a case where the central portion of the front chest image is designated by the imaging menu, the designated portion is recognized with respect to an image 84 before trimming processing which is a radiation image, and trimming processing 86 is automatically performed. As described above, since a learned model is generated, and whether or not trimming processing is to be performed on the image 84 before trimming processing or which portion is to be subjected to trimming processing is estimated and determined by using the learned model as correspondence information, the boundary of the irradiation field or the part set in the imaging menu can be more correctly recognized, and appropriate trimming processing can be performed. By the trimming processing 86, an image 85 after trimming processing which is a radiation image as designated in the imaging menu is obtained.

The defective image determination, the density and/or contrast adjustment, and the adjustment of the angle of the subject are performed in a first image inspection step 91 (FIG. 17), and the first image inspection step 91 is performed first. In the first image inspection step 91, it is preferable to first perform the defective image determination. For the radiation image 16 that has not been regarded as a defective image in the defective image determination, either or both of the density and/or contrast adjustment and/or the adjustment of the angle of the subject in the first image inspection step 91 may be performed regardless of performance order thereof. The trimming processing step is performed after the first image inspection step 91. In addition, the marker superimposition step is performed after the trimming processing step. Any of the steps may or may not be performed. For example, preferably, in the radiation image 16, as the image inspection step, defective image determination is first performed, then either or both of the density and/or contrast adjustment and the adjustment of the angle of the subject are performed in no particular order, and then a trimming processing step is performed. Finally, marker superimposition processing is performed.

Figure 20:
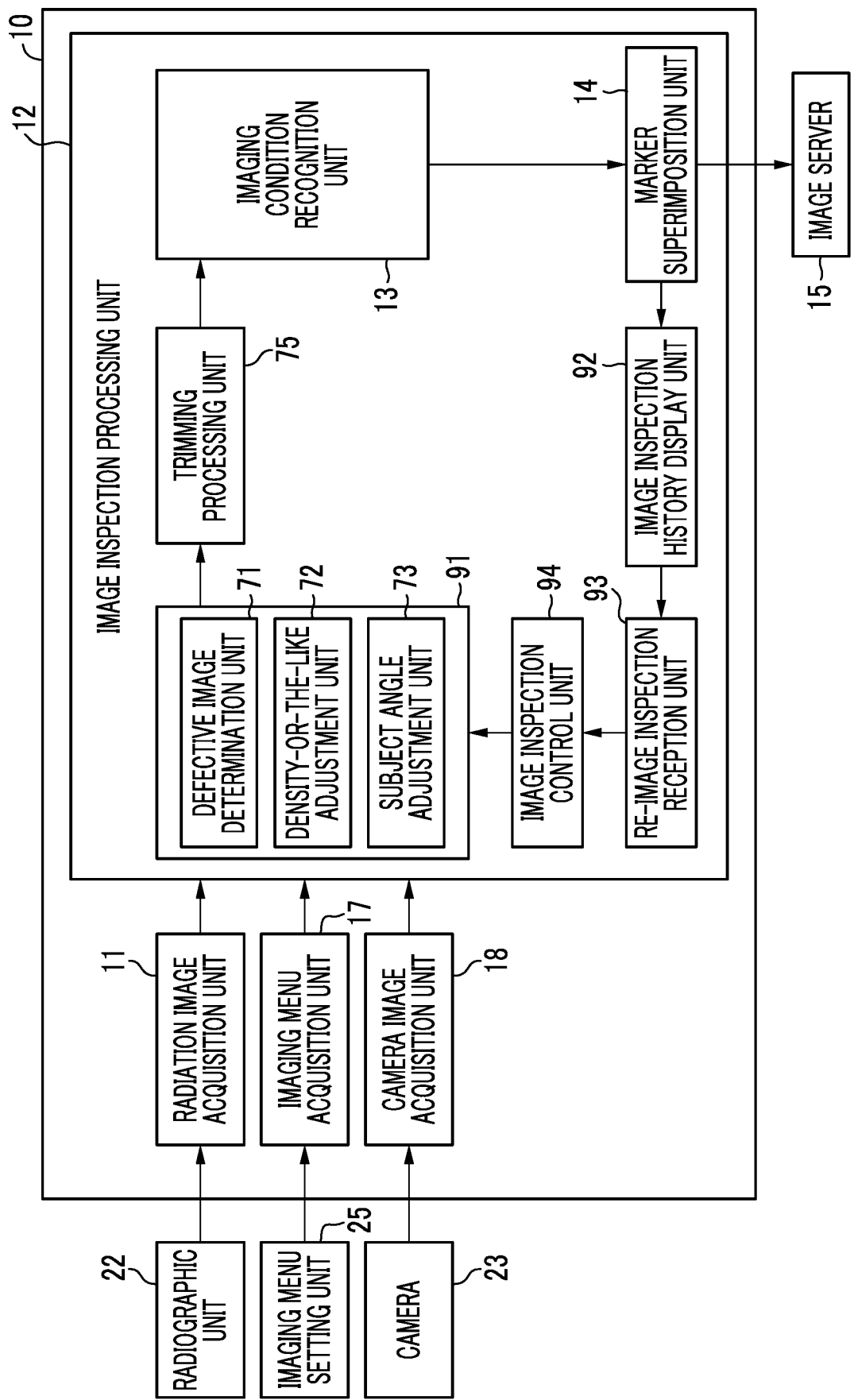

The image inspection device 10 may comprise an image inspection history display unit that displays the history of the image inspection step including the superimposition processing of the marker by the marker superimposition unit 14. As shown in FIG. 20, the image inspection device 10 may comprise an image inspection history display unit 92. The image inspection history display unit 92 displays a series of flows of all the image inspection steps performed on the radiation image 16 as a history. Therefore, the image inspection history display unit 92 can grasp, for example, which step is performed in what order and how even though a plurality of image inspection steps are automatically performed on the radiation image 16. It is also possible to grasp the type of the image inspection step that has not been performed on the radiation image 16.

The image inspection device 10 may comprise a re-image inspection reception unit 93 that receives a redo instruction for at least a part of the image inspection step including the superimposition processing of the marker by the marker superimposition unit 14. Further, the image inspection device 10 may comprise an image inspection control unit 94 that automatically re-executes, in a case where the re-image inspection reception unit 93 receives the redo instruction, at least the image inspection step performed after the image inspection step for which the re-image inspection reception unit 93 receives the redo instruction in accordance with a result of the image inspection step for which the re-image inspection reception unit 93 receives the redo instruction, in addition to redoing the image inspection step for which the re-image inspection reception unit 93 receives the redo instruction.

The re-image inspection reception unit 93 receives a redo instruction for at least a part of the image inspection history displayed on the image inspection history display unit 92. Since various image inspection steps have a priority order for performing the steps, in a case where a redo instruction is given, the executed steps are sequentially released up to the step in which the redo instruction is given. Then, the image inspection step for which the re-image inspection reception unit 93 receives the redo instruction is redone. After that, the image inspection control unit 94 automatically re-executes the image inspection step performed after the image inspection step for which the re-image inspection reception unit 93 receives the redo instruction.

As shown in FIG. 21, the image inspection history display unit 92 displays an image inspection history 95. The image inspection history 95 is, for example, a table displaying an image inspection history, and a main heading of "image inspection history" and a mode display 97 of "automatic re-image inspection mode" are displayed on the first line. The mode display 97 displays either an "automatic re-image inspection mode" in which automatic re-image inspection is performed or a "manual mode" in which re-image inspection is not automatically performed. Next, headings such as "(initial image)", "defective image", "density", "contrast", and "angle adjustment" are displayed as "image inspection processing", and corresponding contents such as "not defective", "no adjustment", and "adjustment, 500/1" are displayed as "content of processing". Similarly, as a corresponding "image", a thumbnail image of the radiation image 16 in a case of each image inspection processing is displayed. As "UNDO", buttons of "maintain" and "redo" are displayed. In the image inspection step in which the color is inverted by turning on the button of "maintain", the re-image inspection is not performed even though the re-image inspection is automatically performed. In the image inspection step in which the color of the button of "redo" is inverted, the re-image inspection is automatically performed, including the subsequent image inspection steps. In a case where the content of processing is "no adjustment" in the "density" of the image inspection processing in a case where the "automatic re-image inspection mode" is selected, the density is adjusted by pressing the button of "redo", and then the subsequent processing is performed.

As described above, according to the image inspection device 10, a plurality of image inspection steps can be automatically performed. In addition, it is possible to set not to perform each of the plurality of image inspection steps. In addition, each of the image inspection steps can obtain an accurate image inspection result by using a machine learning technique or the like. Therefore, the image inspection device 10 having the above configuration and the radiographic system 20 comprising the image inspection device 10 can more accurately superimpose the marker indicating the imaging direction and/or laterality of the subject on the radiation image, for example, to prevent erroneous addition of the marker indicating the imaging direction and/or laterality of the subject in the radiation image. Further, since the correct marker is automatically superimposed on the radiation image, the workload of the image inspection step can be greatly reduced.

Figure 22:
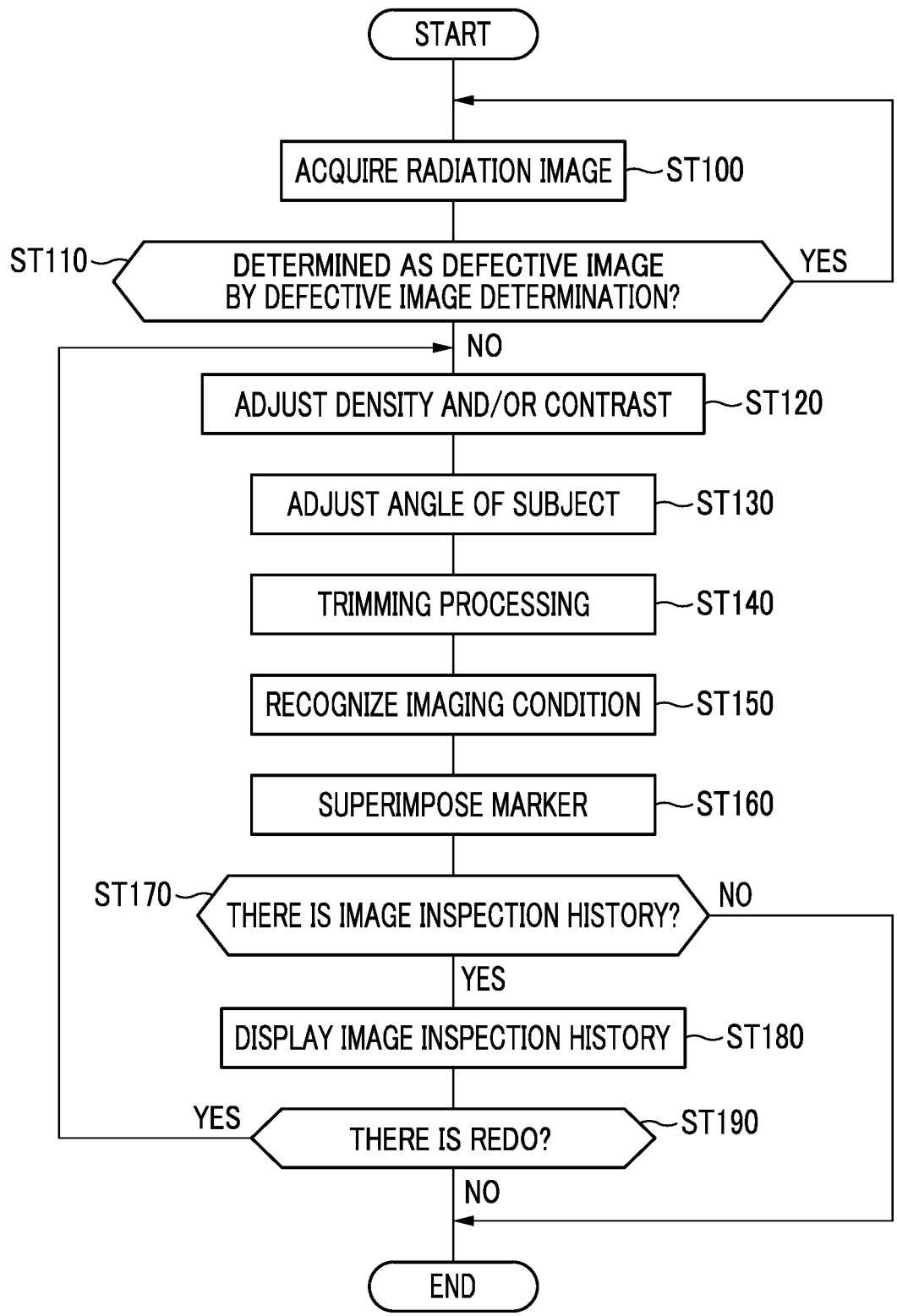
FIG. 22 is a flowchart showing a flow of an image inspection step by an image inspection device.

Next, the operation of the above configuration will be described with reference to a flowchart shown in FIG. 22. First, the radiation image acquisition unit 11 acquires the radiation image 16 (step ST100). First, the defective image determination unit 71 performs defective image determination (step ST110). In a case where the image is defective (YES in step ST110), the radiation image is acquired again. Only those which are not defective proceed to the next image inspection step (NO in step ST110). First, the density-or-the-like adjustment unit 72 adjusts the density and/or contrast (step ST120). In some cases, the adjustment may not be performed. Next, the subject angle adjustment unit 73 adjusts the angle of the subject (step ST130). Next, in a case where these image inspection steps are completed, the trimming processing unit 75 performs trimming processing (step ST140). Next, the imaging condition recognition unit 13 recognizes the imaging condition or acquires the recognition result of the imaging condition obtained before acquisition of the radiation image (step ST150). Based on the recognition result, the marker superimposition unit 14 superimposes the marker on the radiation image 16 that has undergone the image inspection processing so far (step ST160). In a case where there is an image inspection history display (YES in step ST170), the image inspection history is displayed (step ST180), in a case where there is a redo, the image inspection step is automatically redone (YES in step ST190), and in a case where there is no redo (NO in step ST190), the process ends. Even in a case where there is no image inspection history (NO in step ST170), the process ends.

In the above embodiment, a hardware structure of a processing unit that executes various kinds of processing, such as the radiation image acquisition unit 11, the imaging menu acquisition unit 17, the camera image acquisition unit 18, the defective image determination unit 71, the density-or-the-like adjustment unit 72, the subject angle adjustment unit 73, the trimming processing unit 75, the imaging condition recognition unit 13, the marker superimposition unit 14, the image inspection history display unit 92, the re-image inspection reception unit 93, or the image inspection control unit 94, is the following various processors. The various processors include a central processing unit (CPU) that is a general-purpose processor that executes software (programs) to function as various processing units, a graphical processing unit (GPU), a programmable logic device (PLD) that is a processor capable of changing a circuit configuration after manufacture, such as a field programmable gate array (FPGA), and an exclusive electric circuit that is a processor having a circuit configuration exclusively designed to execute various kinds of processing.

One processing unit may be constituted by one of these various processors, or may be a combination of two or more processors of the same type or different types (for example, a plurality of FPGAs, a combination of a CPU and an FPGA, or a combination of a GPU and a CPU). In addition, a plurality of processing units may be constituted by one processor. As an example in which the plurality of processing units are constituted by one processor, first, as represented by a computer such as a client or a server, one processor is constituted by a combination of one or more CPUs and software and this processor functions as the plurality of processing units. Second, as represented by a system on chip (SoC) or the like, a processor that realizes the functions of the entire system including the plurality of processing units by using one integrated circuit (IC) chip is used. As described above, the various processing units are constituted by using one or more of the above described various processors as the hardware structure.

Further, the hardware structure of these various processors is more specifically an electric circuit (circuitry) in a form in which circuit elements such as semiconductor elements are combined. Another aspect of the present invention relates to an image inspection device comprising: a processor, in which the processor acquires a radiation image obtained by imaging a subject using radiation, recognizes an imaging condition relating to an imaging direction and/or laterality of the subject reflected in the radiation image, and superimposes, on the radiation image, a marker indicating the imaging direction and/or laterality of the subject reflected in the radiation image by using a result of the recognition.

The present invention is not limited to the above-described embodiment, and it is needless to say that various configurations can be adopted without departing from the scope of the present invention. Further, the present invention extends to a storage medium for storing a program in addition to the program.

EXPLANATION OF REFERENCES

10: image inspection device
11: radiation image acquisition unit
12: image inspection processing unit
13: imaging condition recognition unit
14: marker superimposition unit
15: image server
16, 51, 52, 53, 54, 58: radiation image
17: imaging menu acquisition unit
17a: imaging menu
18: camera image acquisition unit
18a: camera image
20: radiographic system
21: radiation source
22: radiographic unit
23: camera
24: console
25: imaging menu setting unit
26: operation unit
31: RIS
32: HIS
33: imaging order
41, 42, 43, 44: case
55: upper left end portion
56: upper right end portion
57: lower left end portion
61: position recognition unit
71: defective image determination unit
72: density-or-the-like adjustment unit
73: subject angle adjustment unit
74: first image inspection processing unit
75: trimming processing unit
81: image before subject angle adjustment
82: image after subject angle adjustment
83: subject angle adjustment
84: image before trimming processing
85: image after trimming processing
86: trimming processing
91: first image inspection step
92: image inspection history display unit
93: re-image inspection reception unit
94: image inspection control unit
95: image inspection history
96: cursor
97: mode display
Obj: subject
Ra: radiation
SR: imaging range
F: foot direction
R: right direction
H: head direction
L: left direction
ST100 to ST190: step

What is claimed is:

1. An image inspection device comprising:
a processor configured to:
acquire a radiation image obtained by imaging a subject using radiation based on an imaging instruction including an imaging menu specifying imaging direction and/or laterality of the subject for imaging the subject using the radiation;
acquire the imaging menu specifying the imaging direction and/or laterality of the subject for capturing of the radiation image;
recognize an imaging condition relating to an imaging direction and/or laterality of the subject reflected in the radiation image by comparing the imaging direction and/or laterality of the subject reflected in the radiation image and the imaging direction and/or laterality specified in the imaging menu included in the imaging instruction; and
superimpose, on the radiation image, a marker indicating the imaging condition relating to the imaging direction and/or laterality of the subject reflected in the radiation image by using a result of the recognition.

2. The image inspection device according to claim 1, wherein the processor is further configured to:
acquire, before radiography for obtaining the radiation image, a camera image obtained by imaging the subject by a method different from the radiography; and
recognize the imaging condition by using the camera image.

3. The image inspection device according to claim 1, wherein the processor is further configured to:
recognize a position where the marker is to be superimposed on the radiation image by using the radiation image; and
superimpose the marker on the recognized position or moves the marker to the recognized position.

4. The image inspection device according to claim 1, wherein the processor is further configured to superimpose, in a case of performing defective image determination for determining whether or not re-imaging is necessary for the radiation image, the marker on the radiation image for which the re-imaging is determined to be unnecessary in the defective image determination by using the result of the recognition.

5. The image inspection device according to claim 1, wherein the processor superimposes, in a case of adjusting a density and/or contrast of the radiation image, the marker on the radiation image whose density and/or contrast is adjusted by using the result of the recognition.

6. The image inspection device according to claim 1, wherein the processor is further configured to superimpose, in a case of adjusting an angle of the subject in the radiation image, the marker on the radiation image in which the angle of the subject is adjusted by using the result of the recognition.

7. The image inspection device according to claim 1, wherein the processor is further configured to superimpose, in a case of performing trimming processing of cutting out a part of the radiation image, the marker on the radiation image after the trimming processing by using the result of the recognition.

8. The image inspection device according to claim 1, wherein the processor is further configured to display a history of an image inspection step including superimposition processing of the marker.

9. The image inspection device according to claim 1, wherein the processor is further configured to:
receive a redo instruction for at least a part of an image inspection step including superimposition processing of the marker; and
in a case of receiving the redo instruction, in addition to redoing the image inspection step for which the processor receives the redo instruction, automatically re-execute at least the image inspection step performed after the image inspection step for which the processor receives the redo instruction, in accordance with a result of the image inspection step for which the processor receives the redo instruction.

10. A console which performs a control of a radiographic system including a radiation source that generates radiation and a radiation detector that images a subject using the radiation, comprising:
the image inspection device according to claim 1.

11. A radiographic system comprising:
the console according to claim 10.

12. A radiographic system comprising:
a radiation source that generates radiation;
a radiation detector that images a subject using the radiation based on an imaging instruction including an imaging menu specifying imaging direction and/or laterality of the subject for imaging the subject using the radiation; and
a processor configured to:
recognize an imaging condition relating to an imaging direction and/or laterality of the subject reflected in a radiation image obtained by using the radiographic unit by comparing the imaging direction and/or laterality of the subject reflected in the radiation image and the imaging direction and/or laterality specified in the imaging menu included in the imaging instruction; and
superimpose, on the radiation image, a marker indicating the imaging condition related to the imaging direction and/or laterality of the subject reflected in the radiation image by using a result of the recognition.

* * * * *